(12) United States Patent
Hartmann et al.

(10) Patent No.: US 12,552,007 B2
(45) Date of Patent: Feb. 17, 2026

(54) SYSTEMS THAT COMPRISE POWER TOOLS AND ENERGY SUPPLY DEVICES, AND ENERGY SUPPLY DEVICE

(71) Applicant: Hilti Aktiengesellschaft, Schaan (LI)

(72) Inventors: Markus Hartmann, Mauerstetten (DE); Robert Stanger, Kaufbeuren (DE); Ralf Meixner, Germaringen (DE); Johannes Stempfhuber, Utting am Ammersee (DE); Markus Holubarsch, Landsberg am Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/709,598

(22) PCT Filed: Nov. 14, 2022

(86) PCT No.: PCT/EP2022/081798
§ 371 (c)(1),
(2) Date: May 13, 2024

(87) PCT Pub. No.: WO2023/099183
PCT Pub. Date: Jun. 8, 2023

(65) Prior Publication Data
US 2025/0010451 A1    Jan. 9, 2025

(30) Foreign Application Priority Data
Dec. 1, 2021    (EP) .................................. 21211561

(51) Int. Cl.
*B25F 5/02*    (2006.01)
*B25F 5/00*    (2006.01)
*H02J 7/00*    (2006.01)

(52) U.S. Cl.
CPC ................. *B25F 5/02* (2013.01); *B25F 5/006* (2013.01); *H02J 7/00* (2013.01)

(58) Field of Classification Search
CPC .............. B25F 5/02; B25F 5/006; H02J 7/022
See application file for complete search history.

(56) References Cited

U.S. PATENT DOCUMENTS 4,779,687 A * 10/1988 Schreiber .............. B23B 45/006
173/171
4,794,273 A    12/1988 McCoullough et al.
(Continued)

FOREIGN PATENT DOCUMENTS

CN    206689480 U    12/2017
CN    210684352 U    6/2020
(Continued)

*Primary Examiner* — Lucas E. A. Palmer
(74) *Attorney, Agent, or Firm* — Davidson Kappel LLC

(57) ABSTRACT

A system including a power tool and a first and a second energy supply device, wherein the energy supply devices can be detachably connected to the power tool via an interface. The first energy supply device has a number a of at least two contact partners for transmitting electrical energy to the power tool, whilst the second energy supply device has a number b of at least two contact partners for transmitting electrical energy to the power tool, wherein the number a of contact partners of the first energy supply device differs from the number b of contact partners of the second energy supply device. A system in which the contact partners of the energy supply devices have different coatings.

16 Claims, 8 Drawing Sheets

(56) References Cited

U.S. PATENT DOCUMENTS

| | | | |
|---|---|---|---|
| 6,675,912 | B2 | 1/2004 | Carrier et al. |
| 7,119,516 | B2 | 10/2006 | Denning et al. |
| 7,900,524 | B2 | 3/2011 | Calloway et al. |
| 8,733,470 | B2* | 5/2014 | Matthias ............... B25F 5/02 173/171 |
| 11,205,820 | B2 | 12/2021 | Hanawa et al. |
| 2003/0054230 | A1 | 3/2003 | Al-Hallaj et al. |
| 2004/0146777 | A1 | 7/2004 | Forlino et al. |
| 2004/0175609 | A1 | 9/2004 | Yageta et al. |
| 2005/0077873 | A1* | 4/2005 | Watson ............... H01M 50/296 320/114 |
| 2006/0087286 | A1* | 4/2006 | Phillips ............... H01M 10/441 320/114 |
| 2007/0210744 | A1 | 9/2007 | Watson et al. |
| 2008/0084181 | A1 | 4/2008 | Griffin et al. |
| 2008/0102684 | A1 | 5/2008 | Matthias et al. |
| 2009/0148755 | A1 | 6/2009 | Heinzen et al. |
| 2009/0269654 | A1 | 10/2009 | Kairawicz et al. |
| 2010/0176766 | A1 | 7/2010 | Brandner et al. |
| 2012/0040235 | A1 | 2/2012 | Cho et al. |
| 2012/0293096 | A1 | 11/2012 | Mizoguchi et al. |
| 2013/0130552 | A1* | 5/2013 | Ota ..................... H02J 7/00712 439/639 |
| 2013/0278222 | A1* | 10/2013 | Seiler ................. H01M 10/425 361/679.01 |
| 2014/0087246 | A1 | 3/2014 | Yamamoto et al. |
| 2014/0131059 | A1 | 5/2014 | Verbrugge et al. |
| 2014/0147718 | A1 | 5/2014 | Furui et al. |
| 2014/0326477 | A1 | 11/2014 | Thorson et al. |
| 2015/0151423 | A1 | 6/2015 | Burger et al. |
| 2015/0357683 | A1 | 12/2015 | Lohr et al. |
| 2016/0072106 | A1 | 3/2016 | Baumgartner et al. |
| 2016/0072269 | A1 | 3/2016 | Eschendal et al. |
| 2016/0126533 | A1* | 5/2016 | Velderman .......... H01M 50/204 429/97 |
| 2016/0293909 | A1* | 10/2016 | O'Sullivan .......... B23B 49/00 |
| 2017/0346324 | A1* | 11/2017 | Hunger ................ B25F 5/02 |
| 2017/0352847 | A1 | 12/2017 | Klee et al. |
| 2018/0069208 | A1 | 3/2018 | Rejman et al. |
| 2018/0212213 | A1* | 7/2018 | Kawai ................. H01M 10/441 |
| 2018/0248418 | A1 | 8/2018 | Walme et al. |
| 2018/0366697 | A1 | 12/2018 | Elfering et al. |
| 2019/0259984 | A1* | 8/2019 | Nishikawa .......... H01M 50/296 |
| 2019/0259985 | A1* | 8/2019 | Hanawa ............... H02J 7/0045 |
| 2019/0312242 | A1* | 10/2019 | Barton ................ H01M 10/488 |
| 2019/0326716 | A1 | 10/2019 | Nowalis et al. |
| 2019/0334302 | A1 | 10/2019 | Maier et al. |
| 2020/0094329 | A1 | 3/2020 | Meixner et al. |
| 2020/0127339 | A1* | 4/2020 | Nakano ............... H01M 50/213 |
| 2020/0153142 | A1 | 5/2020 | Meixner et al. |
| 2020/0162007 | A1 | 5/2020 | Sheeks et al. |
| 2020/0215680 | A1 | 7/2020 | Meixner et al. |
| 2021/0234225 | A1* | 7/2021 | Takeda ................ H01M 50/258 |
| 2021/0246615 | A1 | 8/2021 | Gaspard et al. |
| 2022/0181813 | A1 | 6/2022 | Meixner et al. |
| 2022/0260440 | A1 | 8/2022 | Goyal et al. |
| 2022/0288764 | A1 | 9/2022 | Hauser et al. |
| 2024/0222985 | A1* | 7/2024 | Zhao .................. H02J 7/007182 |
| 2024/0266619 | A1* | 8/2024 | Yamaguchi .......... H01M 10/482 |
| 2024/0363945 | A1* | 10/2024 | Valentine ............ H01M 50/247 |

FOREIGN PATENT DOCUMENTS

| | | |
|---|---|---|
| CN | 111816818 A | 10/2020 |
| CN | 112 670723 | 4/2021 |
| DE | 202007014418 U1 | 12/2007 |
| DE | 102006050816 A1 | 4/2008 |
| DE | 102012209925 A1 | 12/2013 |
| DE | 21 2012 000140 U1 | 2/2014 |
| DE | 102013226232 A1 | 6/2014 |
| DE | 102013008829 A1 | 11/2014 |
| DE | 102014110073 A1 | 1/2016 |
| DE | 10 2014 217987 A1 | 3/2016 |
| DE | 10 2015 110308 A1 | 9/2016 |
| DE | 102016203431 A1 | 9/2016 |
| DE | 102016209965 A1 | 12/2017 |
| DE | 10 2016 120329 A1 | 4/2018 |
| DE | 102017217495 A1 | 4/2019 |
| DE | 102017217503 A1 | 4/2019 |
| EP | 2178135 A1 | 4/2010 |
| EP | 2416407 A1 | 2/2012 |
| EP | 2207249 B1 | 7/2015 |
| EP | 3035484 A1 | 6/2016 |
| EP | 3340364 A1 | 6/2018 |
| EP | 3392974 A1 | 10/2018 |
| EP | 3395505 A1 | 10/2018 |
| EP | 3014690 B1 | 3/2020 |
| EP | 3 651227 A1 | 5/2020 |
| EP | 3653340 A1 | 5/2020 |
| EP | 3756831 A1 | 12/2020 |
| EP | 3834992 A1 | 6/2021 |
| GB | 2431433 A | 4/2007 |
| JP | 2007105816 A | 4/2007 |
| WO | WO 2011051174 A1 | 5/2011 |
| WO | WO 2012084394 A1 | 6/2012 |
| WO | WO2016170476 A1 | 10/2016 |
| WO | WO 2019030030 A1 | 2/2019 |
| WO | WO2020247326 A1 | 12/2020 |
| WO | WO2021108118 A1 | 6/2021 |
| WO | WO2019243756 A1 | 8/2021 |
| WO | WO 2023/099146 A1 | 6/2023 |
| WO | WO2023/099155 A1 | 6/2023 |
| WO | WO2023/099163 A1 | 6/2023 |
| WO | WO2023/099165 A1 | 6/2023 |
| WO | WO2023/099184 A1 | 6/2023 |
| WO | WO2023/099186 A1 | 6/2023 |
| WO | WO2023/099195 A1 | 6/2023 |
| WO | WO 2023/099196 A1 | 6/2023 |
| WO | WO 2023/099198 A1 | 6/2023 |
| WO | WO2023/099202 A2 | 6/2023 |
| WO | WO2023/099203 A1 | 6/2023 |
| WO | WO2023/099653 A1 | 6/2023 |
| WO | WO2023099149 A1 | 6/2023 |
| WO | WO2023099156 A1 | 6/2023 |
| WO | WO2023099168 A1 | 6/2023 |
| WO | WO2023099169 A1 | 6/2023 |
| WO | WO2023099181 A1 | 6/2023 |
| WO | WO2023099182 A1 | 6/2023 |
| WO | WO2023099183 A1 | 6/2023 |
| WO | WO2023099194 A1 | 6/2023 |
| WO | WO2023099197 A1 | 6/2023 |
| WO | WO2023099199 A1 | 6/2023 |

* cited by examiner

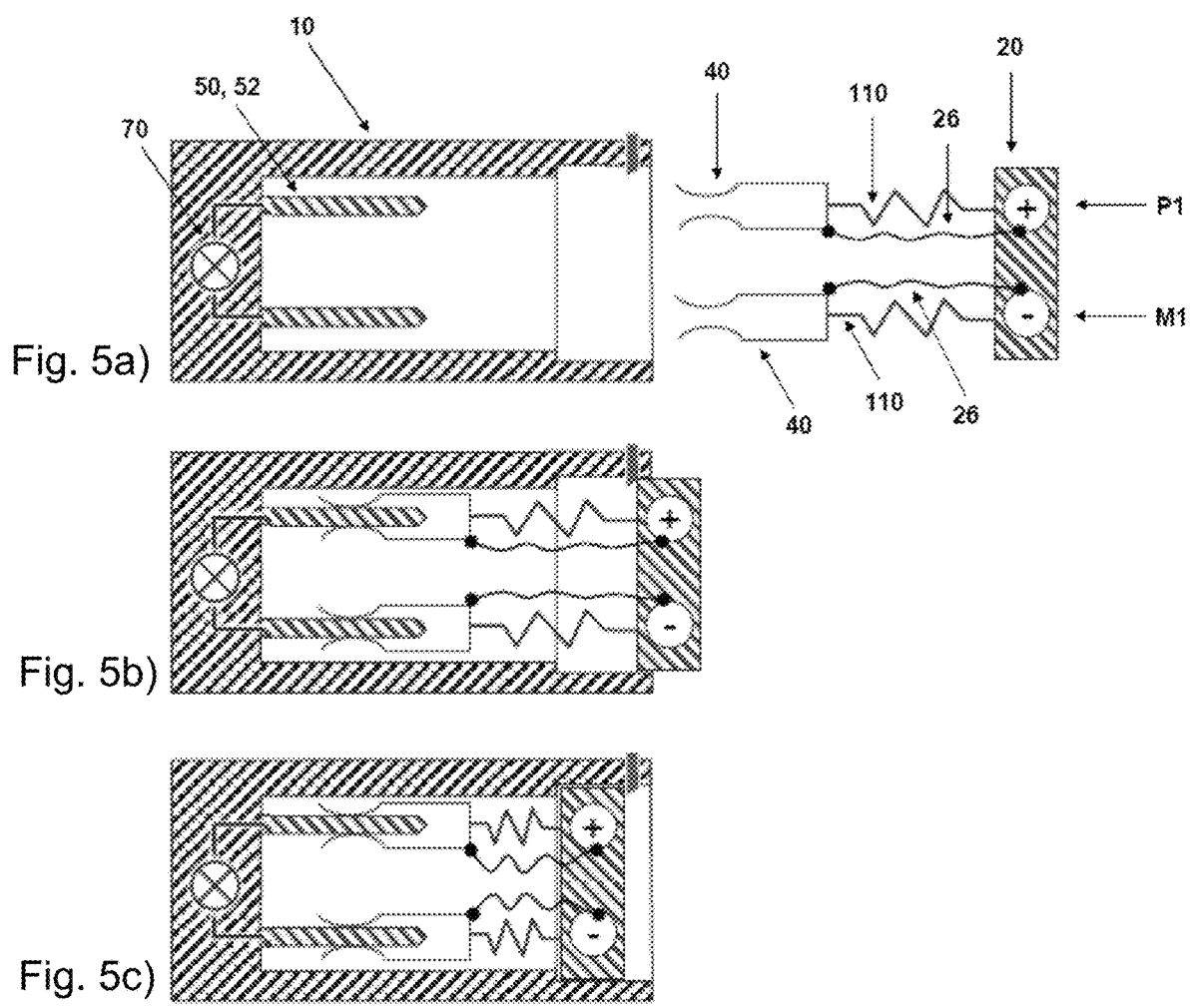

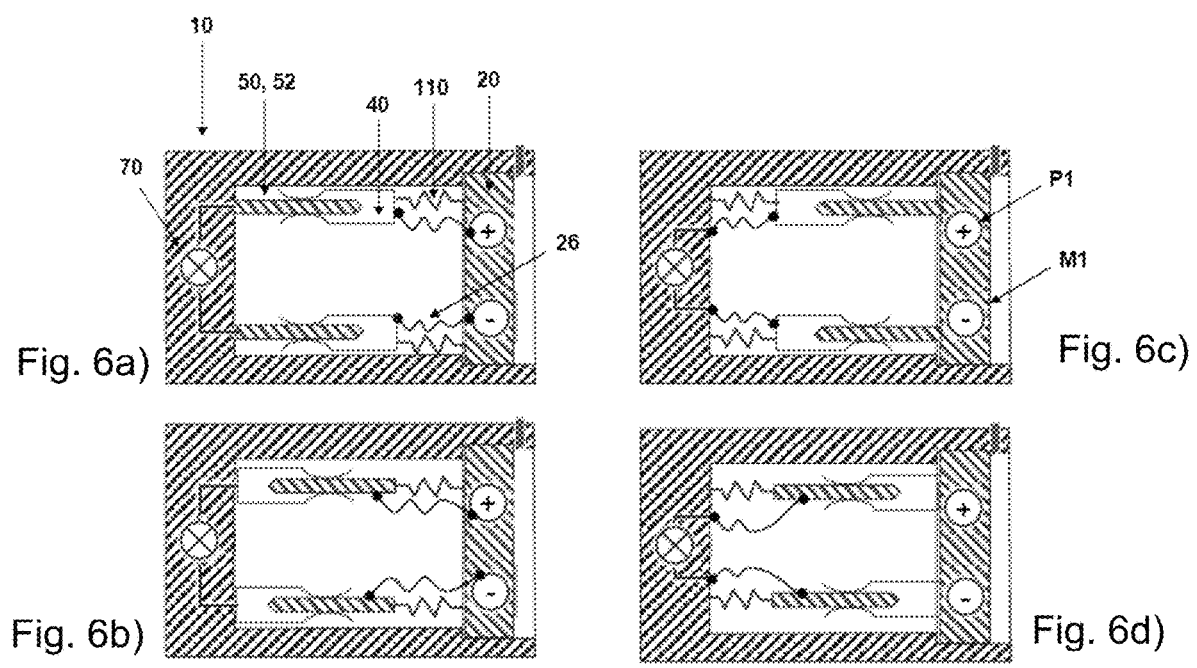

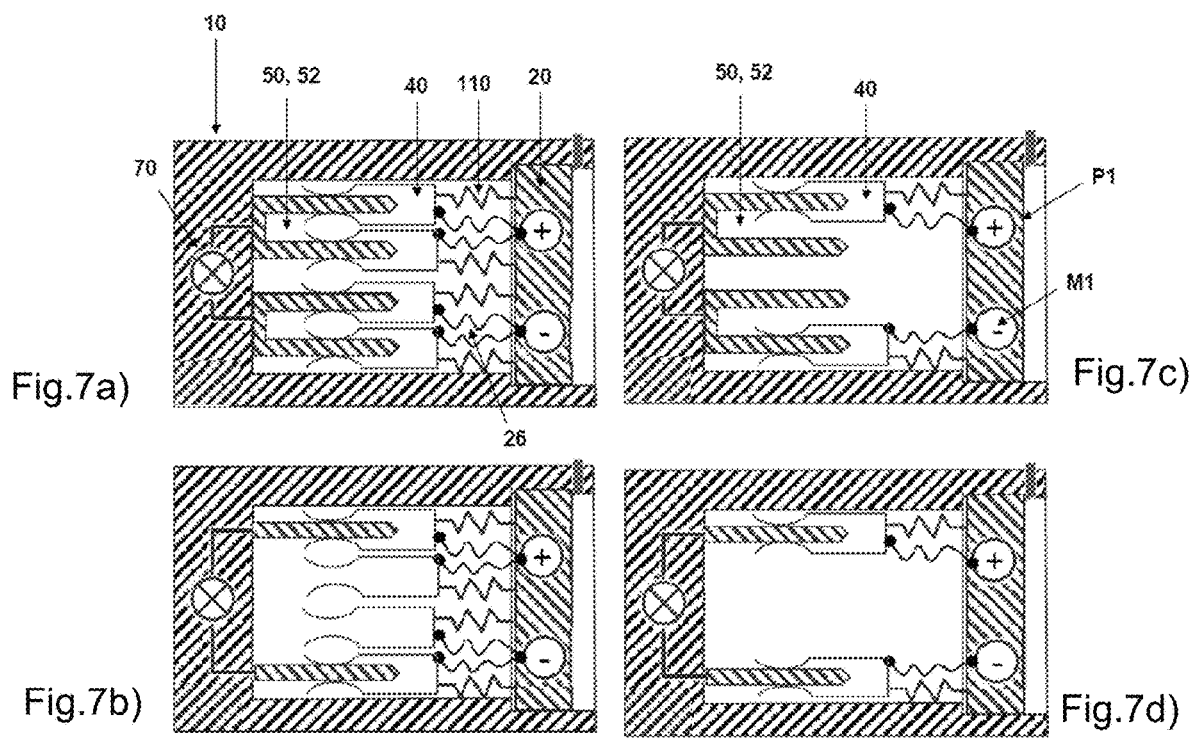

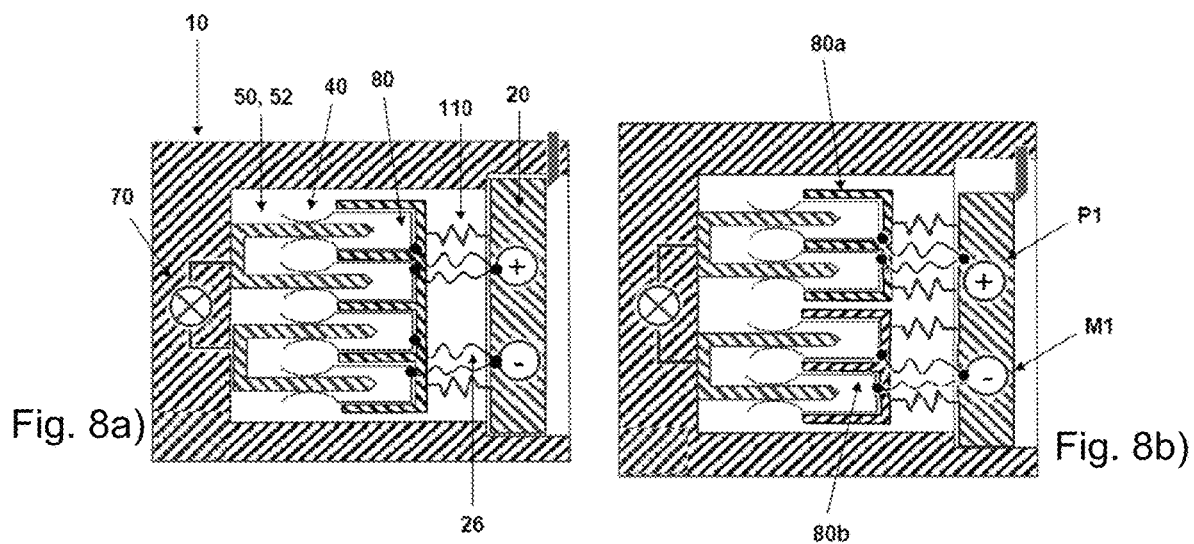

SYSTEMS THAT COMPRISE POWER TOOLS AND ENERGY SUPPLY DEVICES, AND ENERGY SUPPLY DEVICE

The present invention relates to a system comprising a power tool and a first and a second energy supply device, wherein the energy supply devices can be detachably connected to the power tool via an interface. In further aspects, the invention relates to a system in which the contact partners of the energy supply devices and/or of the power tools have different coatings, and to an energy supply device.

BACKGROUND OF THE INVENTION

So-called cordless power tools, for example storage-battery-powered screwdrivers, drills, saws, grinders or the like, may be connected to an energy supply device in order to be supplied with energy. The energy supply device may for example be configured as or comprise a storage battery. Storage batteries usually have a multiplicity of energy storage cells, also known as storage battery cells, by means of which electrical energy can be received, stored and released again. If the storage battery is connected to a power tool, the electrical energy stored in the energy storage cells can be fed to the consumers (e.g. a brushless electric motor) of the power tool. For charging purposes, i.e. for loading the energy storage cells with electrical energy, the storage battery is connected to a charging device, such as a charger, such that electrical energy can enter the energy storage cells.

SUMMARY OF THE INVENTION

High electrical loads can arise during the transmission of electrical energy. However, not all power tools have an identical or similar power requirement, i.e. the electrical loads can vary depending on the energy and/or power requirement of the power tool. In order to allow for these high electrical loads, which may differ depending on the power requirement of the power tool, it is sought to provide a system for supplying electrical energy to power tools, by means of which system the different power requirements of the power tools are reacted to in a flexible manner, and with which system a robust, durable and powerful interface is at the same time provided for transmitting electrical energy for power tools which have a high energy and/or power requirement, wherein a high energy and/or power requirement is commonly associated with elevated electrical loads.

A problem addressed by the present invention consists in overcoming the defects and disadvantages of the prior art and in providing systems for supplying electrical energy to power tools, by means of which system, firstly, the different power requirements of the power tools can be reacted to in a flexible manner, and with which system, secondly, a robust, durable and powerful interface is made possible for transmitting high currents to high-performance power tools with a high energy and/or power requirement.

According to the invention, a system comprising a power tool and at least one first and one second energy supply device is provided, wherein the energy supply devices can be detachably connected to the power tool via an interface. The first energy supply device has a number a of at least two contact partners (a1, a2, . . . ) for transmitting electrical energy to the power tool, whilst the second energy supply device has a number b of at least two contact partners (b1, b2, . . . ) for transmitting electrical energy to the power tool, wherein the number a of contact partners of the first energy supply device differs from the number b of contact partners of the second energy supply device. In the context of the invention, this preferably means that the energy supply devices have a different number of contact partners: a ≠ b. In the context of the invention, the statement that the energy supply devices each have at least two contact partners preferably means that the energy supply devices each have at least one contact partner per pole. The energy supply devices each have a positive pole and a negative pole, wherein each pole may be assigned at least one contact partner. This preferably results in an even number of contact partners on the energy supply devices.

The number of contact partners of the first energy supply device preferably differs from the number of contact partners of the second energy supply device. For example, in the context of the invention, it may be preferred that the power tool has four contact partners, the first energy supply device likewise has four contact partners, and the second energy supply device has two contact partners. This satisfies the condition that the number of contact partners of the first and of the second energy supply device are different, specifically four on one and two on the other. In the context of the invention, it may be preferred that one of the energy supply devices has the same number of contact partners as the power tool: n=a. The other energy supply device then preferably has a number b of contact partners, where b<a. In other words, the other energy supply device may then have a lower number of contact partners than the energy supply device whose number a of contact partners corresponds to the number n of contact partners of the power tool. It is then self-evidently also possible for the second energy supply device to have the same number b of contact partners as the power tool: b=n, whilst the first energy supply device has a lower number a of contact partners than the second energy supply device or the power tool: a<b and a<n.

With the invention, it is advantageously possible for a system for supplying electrical energy to power tools to be provided, by means of which system the different power requirements of power tools are reacted to in a particularly flexible manner, and with which system a robust, durable and powerful interface is at the same time provided for transmitting electrical energy for power tools which have a high energy and/or power requirement. It is furthermore possible to provide an economical contact system variant for power tools that have a low energy and power requirement.

With the invention, it is possible to provide an energy supply platform for power tools that can be connected to different energy supply devices in order to draw electrical energy therefrom. Here, the energy supply device may be selected in accordance with the requirements in terms of electrical energy, current values and/or voltages, wherein a large number of contact partners on an energy supply device can preferably provide more energy, or greater electrical currents, than an energy supply device with a relatively low number of contact partners. The user can thus select the energy supply device in accordance with the requirements of the work operations that are to be performed. If the first energy supply device has more contact partners than the second energy supply device, it is preferable in the context of the invention that the first energy supply device can provide a supply to power tools with a high power requirement, whilst the second energy supply device, with the relatively low number of contact partners, is preferably configured to serve, or supply electrical energy to, power tools with a relatively low power requirement. Provision may self-evidently also be made for relatively low-powered energy supply devices to be combined with high-powered power tools, and vice versa. With the invention, it is advantageously possible for a highly flexible and easily individually adaptable energy supply platform to be provided, which allows an optimum supply of electrical energy to power tools with different power requirements.

In the context of the invention, it is preferred that the energy supply devices of the system have a substantially identical rated voltage. The energy supply devices may for example have a rated voltage of at least 10 V, preferably at least 18 V, in particular of at least 28 V, for example 36 V. A rated voltage in a range from 18 to 22 V, in particular in a range from 21 to 22 V, is very particularly preferred. The energy supply devices each have at least one energy storage cell, wherein the at least one energy storage cell of the energy supply devices has, for example, a voltage of 3.6 V, without being restricted thereto. In the context of the invention, the statement that the energy supply devices of the system have substantially equal rated voltages preferably means that the energy supply devices are configured to be substantially identical in terms of the rated voltages that are to be provided. Here, it is however also intended for relatively small deviations, for example in the range of +/−3 volts, to preferably also be regarded as a "substantially identical rated voltage", for example because aging effects or different states of charge of the energy supply devices can cause the rated voltages to deviate from one another to a small extent, even though the energy supply devices have identical rated voltages in principle, for example from a manufacturing aspect.

The contact partners may for example be the constituent parts of plug connections for transmitting electrical energy. Here, it is preferably the case that mutually corresponding contact partners form a connection, for example a plug connection. Mutually corresponding contact partners may for example be female and male contact partners, as will be described further below. The contact partners may have a different number of individual contacts, contact points or contact regions, with electrical energy being transmitted from one to the other contact partner in these individual contacts, contact points or contact regions. If, for example, the female contact partners are arranged on one of the energy supply devices and the male contact partners are arranged on the power tool, current can be transmitted, or electrical current can flow, from the female contact partners of the energy supply device to the male contact partners of the power tool. In the context of the invention, it is preferred that a combination of contact partners, that is to say a pair of two corresponding contact partners, is characterized by a defined current-carrying capacity.

With the invention, the number of contact partners formed can preferably be varied, or adapted to different power requirements. In particular, the number of pairs of contact partners through which a current flows or by means of which electrical energy is transmitted can be adapted, that is to say for example increased, in accordance with requirements. The electrical load can thus advantageously be better distributed among several contact points.

In the context of the invention, it is preferred that either all n contact partners of the power tool are connected to contact partners of the connected energy supply device, or fewer than n contact partners of the power tool are connected to contact partners of the connected energy supply device, when the first or the second energy supply device has been connected to the power tool. Alternatively, in the context of the invention, it may also be preferred that the power tool has fewer contact partners, with all n contact partners of the power tool then preferably being connected to contact partners of the connected energy supply device, whilst "excess" or "surplus" contact partners of the energy supply device remain unused.

In the context of the invention, it may also be preferred that the power tool has fewer contacts than one or both of the energy supply devices. For example, the power tool may have two contact partners, and one of the energy supply devices may have four contact partners. When this power tool with two contact partners and the energy supply device with four contact partners are connected, it is then the case that two contact partners of the energy supply device remain unused in the connected situation. Altogether, in this exemplary embodiment of the invention, it is possible for two current transmission pairs to be formed. If one energy supply device has four contact partners, it may be preferable in the context of the invention for the other energy supply device to have two or six contact partners.

For example, if the power tool has four contact partners and has been connected to the first energy supply device, where the first energy supply device also has four contact partners, then it is preferably the case that all four contact partners of the power tool are connected to the four contact partners of the first, that is to say connected energy supply device, and are thus "occupied". In other words, for each contact partner of the power tool, there is a contact partner on the energy supply device, such that all contact partners of the power tool are connected to a contact partner of the first energy supply device. Here, both the contact partners of the first energy supply device and of the power tool may be both female or male contact partners. In a particularly preferred exemplary embodiment of the invention, the contact partners of the power tool may be male contact partners, whilst the contact partners of the energy supply devices are female contact partners. In other words, the power tool may comprise contact partners that comprise blades, wherein the blades of the power tool can be received by receiving terminals on the energy supply devices, wherein the receiving terminals are constituent parts of the female contact partners. It is self-evidently also possible for female contact partners to be provided on the power tool and male contact partners to be provided on the energy supply devices. It is furthermore possible for mixed groups of male and female contact partners to be provided on the system devices in question. In the present exemplary embodiment of the invention, in which the power tool has four contact partners and the first energy supply device likewise has four contact partners, the first energy supply device is preferably a higher-powered or more powerful energy supply device than the second energy supply device. Owing to the relatively high number of contact partners that the first energy supply device has, it is also possible for a greater quantity of electrical energy to be transmitted per unit of time, or higher currents can flow, in relation to the second energy supply device. The first energy supply device is thus suitable in particular for providing a supply to power tools which have a high power requirement and which may also be reliant on high discharge currents of the energy supply device.

In the exemplary embodiment of the invention in which the power tool has four contact partners and the first energy supply device likewise has four contact partners, it is for example possible for the second energy supply device to have two contact partners. In this case, two contact partners of the power tool remain unused when the power tool is connected to the second energy supply device in order to draw electrical energy from the second energy supply device. This situation is described by the statement that "fewer than n contact partners of the power tool are connected to contact partners of the connected energy supply device". Here, the letter "n" denotes the number of contact partners of the power tool, which in the present example is four. By virtue of the fact that the second energy supply device has only two contact partners, two contact partners of the power tool remain unused, such that they do not contribute to the transmission of electrical energy from the energy supply device to the power tool. In the present exemplary embodiment of the invention, in which the power tool has four contact partners and the second energy supply device has for example only two contact partners, the second energy supply device is preferably a lower-powered or less powerful energy supply device than the first energy supply device. Owing to the relatively low number of contact partners that the second energy supply device has, it is also possible for a lower quantity of electrical energy to be transmitted per unit of time, or lower currents can flow, in relation to the first energy supply device. The second energy supply device is thus suitable in particular for providing a supply to power tools which have a low power requirement and which do not require high discharge currents of the energy supply device.

The system has two energy supply devices. In the context of the invention, it may also be preferred for the system to have more than two energy supply devices, for example three, four, five, six, . . . , ten, . . . , twenty or more energy supply devices, without being restricted thereto. Here, at least two of the energy supply devices in question have different numbers of contact partners, for example two and four contact partners. The energy supply devices may however also have six, eight or ten contact partners, without being restricted thereto.

It may also be preferred in the context of the invention that the system has more than one power tool. In this preferred embodiment of the invention, the system has a second power tool, wherein the first power tool has at least one first contact partner n1 for receiving electrical energy from one of the energy supply devices, and wherein the second power tool has at least one second contact partner m1 for receiving electrical energy from one of the energy supply devices, wherein the number n of contact partners of the first power tool differs from the number m of contact partners of the second power tool. In the context of the invention, it is preferred that the numbers n and m of contact partners of the first and of the second power tool also differ from one another. The combinations of contact partners and connection possibilities presented for the at least two energy supply devices apply analogously to the power tool.

The number of contact partners of the first power tool preferably differs from the number of contact partners of the second power tool. The following example is preferably based on one energy supply device to which the two power tools can be connected. Said single energy supply device preferably has a number of a contact partners. For example, in the context of the invention, it may be preferred that the energy supply device has four contact partners, the first power tool likewise has four contact partners, and the second power tool has two contact partners. This satisfies the condition that the number of contact partners of the first and of the second power tool are different, specifically four on one and two on the other. In the context of the invention, it may be preferred that one of the power tools has the same number of contact partners as the energy supply device: n=a. The other power tool then preferably has a number m of contact partners, where m>a or m<a. In other words, the other power tool may have a lower or higher number m of contact partners than the power tool whose number n of contact partners corresponds to the number a of contact partners of the energy supply device. It is self-evidently also possible for the second power tool to have the same number of contact partners as the energy supply device: m=a, whilst the first power tool has a lower or higher number n of contact partners than the second power tool or the energy supply device: n>m and n>a or n<m and n<a.

In the context of the invention, it is preferred that the energy supply devices have an even number of contact partners. In the context of the invention, it is preferred that the energy supply devices each have a positive pole and a negative pole, with each pole being connected to at least one contact partner. It is preferred that the first energy supply device has a first positive pole and a first negative pole and the second energy supply device has a second positive pole and a second negative pole, with each pole having been connected to at least one contact partner.

In the context of the invention, the term "power tool" should be understood to mean a typical device that can be used on a construction site, for example a building construction site and/or a civil engineering construction site. These may be hammer drills, chisels, core drills, angle or cut-off grinders, cutting devices or the like, without being restricted thereto. In addition, auxiliary devices such as those occasionally used on construction sites, such as lamps, radios, vacuum cleaners, measuring devices, construction robots, wheelbarrows, transport devices, feed devices or other auxiliary devices, can be "power tools" in the context of the invention. The power tool may in particular be a mobile power tool, wherein the energy supply device may also be used in particular in stationary power tools, such as frame-mounted drills or circular saws. However, preference is given to hand-held power tools that are, in particular, operated using a storage battery or battery.

In the context of the invention, it is preferred that the first energy supply device and the second energy supply device are configured to supply electrical energy to the power tool. For this purpose, a respective one of the energy supply devices can be detachably connected to the power tool whilst the other energy supply device is for example arranged in a charger and is being charged. The connection is preferably realized by means of an interface. The interface preferably comprises at least one female contact partner and one male contact partner, which may be arranged on the power tool or on the energy supply device. In the context of the invention, it is preferred that the power tool has at least two contact partners n for transmitting electrical energy from the energy supply devices to the power tool. The contact partners a and b of the first and of the second energy supply device preferably correspond with the contact partners n of the power tool. In the context of the invention, the term "correspond" preferably means that the contact partners fit together such that they can be connected to one another. The contact partners may in each case be of female or male form, wherein the female contact partners may preferably be formed by a receiving terminal, and the male contact partners may comprise a blade for insertion into the receiving terminal. In the context of the invention, the contact partners are preferably also referred to as power contacts of the interface. In the context of the invention, it is preferred that in each case one female contact partner can be connected to one male contact partner in order to establish a current-transmitting connection between the power tool and one of the energy supply devices. A pair of corresponding contact partners preferably comprises one male and one female contact partner.

In the context of the invention, it is preferred that the energy supply devices may have female contact partners and/or male contact partners. Furthermore, the power tool may also have female contact partners and/or male contact partners. In the context of the invention, it may however also be preferred that the energy supply devices and/or the power tool have "mixed contact partners", that is to say at least one male and at least one female contact partner. In the context of the invention, it is preferred that the system partners have mutually corresponding contact partners, such that in each case one male contact partner interacts with one female contact partner to form a current transmission pair.

In a second aspect, the invention relates to a system that comprises such a power tool, a first energy supply device and a second energy supply device. The energy supply devices can be detachably connected to the power tool by means of an interface. The first energy supply device has at least two first contact partners for transmitting electrical energy to the power tool, whilst the second energy supply device has at least two second contact partners for transmitting electrical energy to the power tool, wherein the first contact partners have a first coating and the second contact partners have a second coating. In the context of the invention, it is preferred that the first coating differs from the second coating. In the context of the invention, the statement that the "first coating differs from the second coating" preferably means that the contact partners of the energy supply devices have different coatings, that is to say that the coatings are different. The difference may for example also consist in the contact partners of one energy supply device merely having a very rudimentary or very thin coating, and the contact partners of the other energy supply device having a considerably thicker or considerably higher-quality coating.

In the context of the invention, it is preferred that the at least two first contact partners of the first energy supply device have a first contact material, and the at least two second contact partners of the second energy supply device have a second contact material, wherein the contact materials may form the coatings of the contact partners of the energy supply devices.

The coating of the contact partners may for example comprise metal or metal alloys, wherein coatings with the same alloy but with a different composition of the alloy may also be regarded in the context of the invention as "different coatings". The alloy compositions differ in particular if the fraction of at least one alloy partner differs by more than 5%. For example, in the context of the invention, if a first coating comprises an alloy composed of palladium, copper and silicon with a composition of Pd75Cu15Si10, then a second coating that comprises an alloy composed of palladium, copper and silicon with a composition of Pd60Cu30Si10 would be a different alloy, and a different coating, than the first coating. For example, in the context of the invention, if a first coating comprises an alloy composed of palladium, copper and silicon with a composition of Pd75Cu15Si10, then a second coating that comprises an alloy composed of palladium, copper and silicon with a composition of Pd72Cu17Si11 would preferably be the same alloy, and "the same coating", as the first coating owing to the small differences in the composition.

The coatings may for example also differ in that one of the energy supply devices has a coating and the other energy supply device has a very slight coating. In the context of the invention, the absence of a coating may preferably be regarded as a coating with different characteristics. In this embodiment of the invention, the at least one first contact partner may have a first coating and the at least one second contact partner may have a very slight coating, wherein the virtual absence of a second coating on the at least one second contact partner is preferably regarded in the context of the invention as a "second coating with different characteristics". The statement that "the contact partners of the energy supply devices have different coatings" is then to be understood in the context of the invention to mean that the first contact partners of the first energy supply device have a first coating and the second contact partners of the second energy supply device have a very slight or scarcely measurable coating. In other words, in the context of the invention, it may be preferred that the first contact partners have a first coating and the second contact partners have a second coating, wherein the first coating differs from the second coating, or that the first contact partners have a first coating and the second contact partners have a very slight second coating.

It is possible with the invention, for example through the use of high-grade metal coatings, for the current-carrying capacity of the pairs of contact partners to be improved, or adapted to individual power requirements. Through the provision of contact partners with a different or very slight coating, it is possible with this aspect of the invention to provide a particularly cost-efficient and resource-conserving energy supply platform for power tools. The coated contact partners can furthermore be particularly robust with respect to mechanical and/or electrical loads, such that a particularly robust and durable interface can be provided between power tool and energy supply device. The coatings or the contact materials may for example comprise metal or metal alloys. For example, the coatings or the contact materials may comprise nickel, nickel-phosphorous, silver, palladium, gold-palladium or numerous other elements or compounds.

It is advantageously possible with this system, too, to provide an energy supply platform for power tools, in the case of which the power tools can be connected to different energy supply devices in order to draw electrical energy therefrom. Here, the coating of the contact partners of the energy supply device may be selected in accordance with the requirements in terms of electrical energy, current values and/or voltages, wherein, for example, a first coating may allow the transmission of more energy or higher currents than an energy supply device with a second coating. The user can thus select the energy supply device in accordance with the requirements of the work operations that are to be performed. With the invention, it is advantageously possible for a highly flexible and easily individually adaptable energy supply platform to be provided, which allows an optimum supply of electrical energy to power tools with different power requirements.

In this embodiment of the invention, too, the energy supply devices of the system may have a substantially identical rated voltage. The energy supply devices may for example have a rated voltage of at least 10 V, preferably at least 18 V, in particular of at least 28 V, for example 36 V. A rated voltage in a range from 18 to 22 V, in particular in a range from 21 to 22 V, is very particularly preferred. The energy supply devices each have at least one energy storage cell, wherein the at least one energy storage cell of the energy supply devices has, for example, a voltage of 3.6 V, without being restricted thereto. In the context of the invention, the statement that the energy supply devices of the system have substantially equal rated voltages preferably means that the energy supply devices are configured to be substantially identical in terms of the rated voltages that are to be provided. Here, it is however also intended for relatively small deviations, for example in the range of +/−3 volts, to preferably also be regarded as a "substantially identical rated voltage", for example because aging effects or different states of charge of the energy supply devices can cause the rated voltages to deviate from one another to a small extent, even though the energy supply devices have identical rated voltages in principle, for example from a manufacturing aspect.

For example, the first coating of the contact partners of the first energy supply device may be a coating with increased wear resistance, wherein the first energy supply device is in this case preferably an energy supply device which can provide particularly high output currents and which is thus highly suitable for supplying energy to particularly high-powered power tools. Consequently, in this exemplary embodiment of the invention, the first coating may be a particularly wear-resistant, high-quality coating that satisfies high power requirements and withstands high electrical loads. In particular, such a particularly wear-resistant, high-quality coating may be used on novel and improved energy supply devices that are distinguished in particular by a long service life.

For example, the second coating of the contact partners of the second energy supply device may be a coating with reduced wear resistance in relation to the first energy supply device, wherein the second energy supply device is in this case preferably an energy supply device which can provide relatively low output currents and which is thus highly suitable for supplying energy to relatively small, hand-held power tools. Consequently, in this exemplary embodiment of the invention, it is possible with the second coating to provide an inexpensive alternative in order to introduce greater quantities of energy supply devices into the market at low prices.

The coatings may also differ in that different plug-action forces are required in order to separate the corresponding contact partners from one another, or to connect them. For example, coatings with relatively low plug-action forces may be used in the case of relatively low-powered energy supply devices, and coatings with relatively high plug-action forces may be used in the case of relatively high-powered energy supply devices. Here, low plug-action forces are preferably associated with reduced friction between the contact partners, such that it is easier for the user to connect the power tool and energy supply device to another, or separate them from one another.

In the context of the invention, it is preferred that the power tool has contact partners, wherein the contact partners of the power tool have a power tool coating, wherein the power tool coating corresponds to the first coating or to the second coating of the contact partners of the energy supply devices. In this context, the term "correspond" means that the contact partners of the power tool likewise have a coating that is configured for transmitting high currents, with low wear, when the power tool has been connected to the first energy supply device. Analogously, the contact partners of the power tool may also have a coating that is configured for transmitting relatively low currents when the power tool has been connected to the second energy supply device.

In the context of the invention, it is preferred that one of the coatings is a coating with increased wear resistance. The coatings may self-evidently also differ in terms of other features, such as composition, color, material, layer thickness or the like, without being restricted thereto.

In the context of the invention, it is preferred that the at least one male contact partner is arranged on the power tool.

The male contact partners may comprise blades that can be inserted into a female contact partner on the energy supply devices. According to an advantageous embodiment of the present invention, provision may be made for the male contact partners to be configured as pin-like plug connectors or blades, and the female contact partners of the interface as terminals with elastically deformable legs for receiving the pin-like plug connectors or blades. The male contact partner may be formed by a protruding region and a stop, wherein the protruding region is inserted in one of the female contact partners in a plugged-together state of the interface in which the energy supply device has been connected to the power tool (therefore also referred to as "connected state"). In an unconnected state, the power tool and the energy supply device may be independent and separate from one another. This may be the case for example when the energy supply device is being charged and is arranged in a charger in order to be charged.

The energy supply device may preferably comprise at least one storage battery, wherein the energy supply device is configured to supply electrical energy to the power tool. Electrical energy is output from the energy supply device to the power tool in particular in the connected state in which the power tool has been connected to the energy supply device via the interface. The female and male contact partners engage with one another when in the connected state, such that electrical current or electrical energy can flow between the contact partners via a contact region.

In the context of the invention, it is preferred that the at least one female contact partner is arranged on the energy supply device. The at least one female contact partner may preferably be formed by a receiving terminal which is configured to receive the blade of the male contact partner. For this, the female contact partner may have two legs composed of an elastic material, wherein the legs are pushed apart on insertion of the male contact partner such that the male contact partner comes to lie in an interior of the female contact partner or of the receiving terminal. In the context of the invention, this situation is referred to as the connected or plugged-together state of the interface. Owing to the elasticity of the material from which the legs of the female contact partner are formed, the legs of the receiving terminal of the female contact partner in this connected state press on the blade or the protruding region of the male contact partner, such that a contact region is created between the contact partners. Preferably, electrical current or electrical energy is exchanged between the contact partners via this contact region, such that current or electrical energy can flow from the energy supply device toward the power tool. The legs of the female contact partner may preferably comprise or be manufactured from spring steel.

In the context of the invention, it is preferred that the legs of the female contact partner or of the receiving terminal have a minimal spacing in the contact region so as to allow particularly good contact with the male contact partner. In the contact region with respect to the male contact partner, the female contact partner preferably has a taper that is defined by the minimal spacing between the legs of the female contact partner. In the context of the invention, it is preferred that the legs of the female contact partner have copper or are coated with a copper layer. By means of the copper, the current flow or the flow of electrical energy from the energy supply device to the power tool can be further optimized, such that it is in particular also possible for high currents, for example 50 amperes, 70 amperes or 100 or more amperes, to flow through the interface. The currents may preferably be constant currents.

By virtue of the fact that the energy supply device is detachably connected to the power tool by means of the interface, the respective electrical contacts of the power tool and of the energy supply device preferably bear against one another in force-fitting fashion. Here, the female contact partner may comprise a preferably spring-mounted clamp or receiving terminal, whilst the male contact partner may have an insert element that can be inserted into the clamp or the receiving terminal.

In the context of the invention, it is preferred that the interface comprises a receiving device for receiving the at least one female contact partner. In other words, in the context of the invention, it may be preferred that the female contact partners are arranged individually on the interface, or that they are part of a receiving device, wherein the individual female contact partners or the receiving device may be components of either the power tool or the energy supply device. In the context of the invention, it is most preferred that the individual female contact partners or the receiving device are/is part of the energy supply device.

The receiving device may form a compartment in which the female contact partners can be received. A contact block can advantageously be provided in this way, such that the female contact partners can move conjointly or be moved conjointly. The receiving device can preferably receive one to eight, preferably two to six, and most preferably four, female contact partners.

In the context of the invention, it is preferred that at least one contact partner is spring-mounted. This may be a contact partner of the power tool and/or of the energy supply device, wherein the power tool and the energy supply device can be referred to as connection partners of the interface. In the context of the invention, if the power tool and/or the energy supply device has more than one contact partner, it is preferred that all contact partners of a connection partner are spring-mounted. For example, the power tool may have four contact partners, with all four contact partners being spring-mounted. For example, the energy supply device may have two contact partners, with both contact partners being spring-mounted. The contact partners may preferably be male and/or female contact partners. The spring mounting is preferably realized by virtue of the contact partners being connected to the power tool and/or to the energy supply device via an elastic spring-mounting means. The spring mounting may preferably be realized by virtue of the spring-mounted contact partners comprising an elastic spring-mounting means, wherein the elastic spring-mounting means is configured to connect the respective contact partner to the corresponding connection partner of the interface. If, for example, all contact partners of the power tool and/or of the energy supply device are spring-mounted, then preferably all contact partners have such an elastic spring-mounting means. In the context of the invention, such spring mounting is preferably referred to as "individual spring mounting".

In the context of the invention, it is preferred that the power tools and/or the energy supply devices have at least one receiving device for receiving at least one contact partner. If one of the connection partners of the interface has a receiving device, this receiving device may be spring-mounted. In the context of the invention, this preferably means that the receiving device may have been connected to the power tool and/or to the energy supply device by an elastic spring-mounting means. In the context of the invention, it is preferred that all contact partners of a power tool and/or of an energy supply device may be arranged in one receiving device. For example, the power tool may have four contact partners, with all four contact partners being received in one receiving device. For example, the energy supply device may have two contact partners, with both contact partners being received in one receiving device. In the context of the invention, it may however also be preferred that one of the power tools and/or one of the energy supply devices may have more than one receiving device. For example, if the power tool has four contact partners, the power tool may for example have two receiving devices, with each receiving device receiving two contact partners. In this exemplary embodiment of the invention, it is preferred that both receiving devices are individually spring-mounted by virtue of the fact that they each have an elastic spring-mounting means. For example, if the energy supply device has two contact partners, the energy supply device may for example have two receiving devices, with each receiving device receiving one contact partner. In this exemplary embodiment of the invention, it is preferred that both receiving devices are individually spring-mounted by virtue of the fact that they each have an elastic spring-mounting means. The receiving device may preferably form a contact (means) block, wherein, in this exemplary embodiment of the invention, the spring mounting is implemented on a block-by-block basis.

In the context of the invention, it is preferred that the at least one elastic spring-mounting means is assigned to the receiving device, preferably as a whole. In this case, it is for example possible for a receiving device, which can receive four female contact partners, for example, to be connected by means of an elastic element to the corresponding system component-power tool or energy supply device. The decoupling then takes place for example between the energy supply device and the receiving device, such that the female contact partners in the receiving device are decoupled or protected from movements and/or vibrations of the energy supply device and/or of the power tool. Tests have shown that the use of a receiving device offers particularly good protection against tilting movements, and that the friction moment between the contacts is considerably increased. The receiving device with the power contacts may preferably form a contact block, wherein, by means of the invention, this preferably movably mounted or spring-mounted contact block is particularly well protected against tilting movements or the like. This advantage of the invention may be achieved by virtue of support surfaces and the friction forces of the individual terminal contacts of the female contact partners being spaced far apart from one another laterally or substantially perpendicularly with respect to the insertion direction, and dynamic tilting moments thus being able to be particularly well absorbed owing to the large lever arm of the mounting. The same applies to the support surfaces of a contact block if the female contact partners are received by a receiving device. The statements above also apply analogously to male contact partners, in particular if they are received by a receiving device and form a contact block.

Vibrations and oscillations acting on the contact partners, which can result in a relative movement and even an actual breaking of the contact connection between the storage battery and the power tool, can be easily compensated for through the provision of the elastic spring-mounting means.

The spring mounting of the contact partners of the interface has numerous advantageous effects. A first effect relates to the relative movements or the relative travels between the contact partners that generate the form-fitting and/or force-fitting connection between power tool and energy supply device. These relative movements or the relative travels can undesirably increase the contact resistance of the interface, with said increase initially being independent of the state of wear of the interface. In the context of the invention, this preferably means that the increased contact resistances may arise even in the new state of a system composed of power tool and energy supply device if, in the interface between the system components, undesired relative movements of the contact partners of the interface occur. Furthermore, the relative movements between the contact partners can lead to wear and ultimately oxidation, such that the contact resistance of the interface can disadvantageously increase further. In particular, wear of the noble layers of the contact partners can occur, which ultimately leads to atmospheric oxidation involving atmospheric oxygen and/or to fretting corrosion. By virtue of the fact that the invention considerably reduces the relative movements between the contact partners and thus the contact resistance, it contributes significantly to achieving that particularly high electrical currents can be transmitted from the energy supply device to the power tool by means of the interface. The invention furthermore reduces undesired wear of the contact partners, and thus likewise makes a valuable contribution to extending the service life of the interface.

In the context of the invention, it is preferred that the elastic spring-mounting means lead to mechanical decoupling between the energy supply device and the unit composed of male and female contact partners. Alternatively, the elastic means may lead to mechanical decoupling between the power tool and the unit composed of male and female contact partners. Owing to the mechanical decoupling, any undesired relative movement between the contact partners is not transmitted, but is advantageously compensated by the elastic means.

The improvement of the contact resistance advantageously leads to an increased current-carrying capacity of the interface, such that the invention allows operation of or electrical energy supply to power tools in higher power classes, i.e. particularly high-powered power tools. The reduction in power losses in the contact resistance may advantageously lead to a reduced thermal load on the surrounding components. In particular, components composed of thermoplastic material can thus be effectively protected from damage owing to excessive introduction of heat.

In the context of the invention, it is preferred that the contact partner on which the elastic spring-mounting means acts is movably mounted. In other words, the contact partner to which the elastic spring-mounting means is operatively connected may be movably mounted. In the context of the invention, it is preferred that the movably mounted contact partner and/or the movably mounted receiving device is spring-mounted. If more than one contact partner is provided per connection partner of the interface, or if the power tool and/or the energy supply device have/has more than one receiving device, it may be preferred in the context of the invention that the movably mounted contact partners and/or the movably mounted receiving devices are spring-mounted. In this way, the relative movements between the contact partners, and the contact resistance, can be further considerably reduced, and the service life of the interface considerably extended. It may furthermore be preferred that the elastic spring-mounting means acts on a receiving device. The receiving device may receive male and/or female power contacts, and may likewise be movably mounted. The receiving device is movably mounted in particular if it is operatively connected to the at least one elastic spring-mounting means, or if said elastic means act on the receiving device. In the exemplary embodiment of the invention in which individual contact partners are arranged in a receiving device, the statement that the at least one elastic spring-mounting means is configured to act on the at least one male contact partner or on the at least one female contact partner preferably means that the at least one elastic spring-mounting means is configured to act on the receiving device in which individual contact partners are contained. The receiving device may form a contact block or contact means block which can be movably mounted or spring-mounted by the elastic means. In the context of the invention, it is preferred that the receiving device comprises the contact partners of a connection partner of the interface, i.e. power tool or energy supply device. However, in the context of the invention, it may also be preferred that several receiving devices are provided, which may each receive a sub-quantity of the contact partners of a connection partner. These several receiving devices may preferably also be spring-mounted by virtue of the elastic means for reducing the relative movement acting on these several receiving devices.

The contact partner on which the elastic spring-mounting means acts is preferably, when in the connected state, mounted so as to be movable relative to the power tool or relative to the energy supply device. If the spring mounting is provided on the power tool side, i.e. the at least one elastic means acts on the contact partner or the receiving device of the power tool, the resulting spring mounting in the region of the power tool preferably contributes to achieving that the corresponding contact partner, when in the connected state, is mounted so as to be movable relative to the power tool. If the spring mounting is provided on the energy supply device side, i.e. the at least one elastic means acts on the contact partner or the receiving device of the energy supply device, the resulting spring mounting in the region of the energy supply device preferably contributes to achieving that the corresponding contact partner, when in the connected state, is mounted so as to be movable relative to the energy supply device.

The statement that the elastic spring-mounting means is configured to act on the at least one male contact partner and/or on the at least one female contact partner firstly encompasses the possibility that the elastic means acts on one of the groups of contact partners, for example on all contact partners, which are arranged on the energy supply device, or on all contact partners which are arranged on the power tool. In the context of the invention, it may however also be preferred that both the power tool and the energy supply device comprise elastic spring-mounting means for the contact partners thereof. In this embodiment of the invention, the elastic means acts on the at least one male contact partner and on the at least one female contact partner. If one or both groups of contact partners is arranged in a receiving device, the elastic means may act on one of the receiving devices. If the contact partners both of the energy supply device and of the power tool have a receiving device, the elastic means may also act on both receiving devices. Action both on the contact partners of the power tool and on the contact partners of the energy supply device may be implemented for example by virtue of a hard spring being used in the case of one of the connection partners-energy supply device or power tool—and a soft (er) spring being used in the case of the other connection partner—power tool or energy supply device.

The at least one elastic spring-mounting means may preferably comprise at least one elastic element such as a spring. Here, the elastic element may be configured in the form of a spring, and in particular as a spiral, bending or coil spring. Alternatively, the elastic element may be configured as a component composed of an elastically deformable material. An elastomer is also a possible material in this case. It is thus possible to easily counteract a vibration-related movement of the connection element in multiple directions, i.e. not only in the direction toward or away from the connection element. In addition, the undesired relative movements between the contact partners of the interface can be effectively shortened through the use of an elastic element.

In the context of the invention, it is preferred that, on insertion into the female contact partner, the male contact partner compresses the least one elastic means such that the elastic means is brought into a stressed state. This compressing may preferably constitute an elastic deformation or a compression. Preferably, the terms "compressing", "compression" and "elastic deformation", and the corresponding verbs, are used synonymously in the context of the present invention. The compressing of the elastic means advantageously leads to the stressed state. Alternatively or additionally, the at least one male contact partner may also be spring-mounted. In the context of the invention, the term "spring-mounting" is to be understood to mean that the spring-mounted contact partner is operatively connected to the elastic means for reducing relative movements between the contact partners. In other words, the elastic spring-mounting means may act on one of the contact partners, whereby spring mounting of the corresponding contact partner is advantageously achieved. In the context of the invention, it is preferred that, when in the inserted, connected or locked state, in which the energy supply device and the power tool have been connected together, the at least one elastic means is in a stressed or tensioned state. In the context of the invention, it is preferred that the elastic means are prestressed even when in the uninstalled state, wherein a force flow within the energy supply device is closed by said elastic means. The at least one female contact partner may thereby be supported on the energy supply device. The stress of the at least one elastic means for reducing relative movement between the contact partners, in particular when the contact system is in the connected state, causes the male and female contact partners to be pressed firmly against one another such that particularly good contact is formed between the contact partners. Owing to this "spring-mounted" contacting of the contact partners, or owing to the particularly close contact of the contact partners, the power density of the resulting contact can be considerably increased, such that it is made possible to transmit constant electrical currents in a range of more than 50 amperes, preferably more than 70 amperes, or particularly preferably more than 100 amperes. Also, the service life of the contact system can be substantially extended, such that the contact system is particularly suitable for energy supply devices with long service lives and/or high output currents, because the relatively high mechanical and/or electrical requirements on an interface can be optimally satisfied by means of the invention.

In the context of the invention, it is preferred that, as the energy supply device is connected to the power tool, the energy supply device is introduced for example into a cavity of the power tool. In order to establish the electrical connection between the connection partners of "energy supply device" and "power tool", in a first step, the contact partners are brought into contact with one another. This preferably takes place by virtue of the blades of the male contact partners being introduced into the receiving terminals of the female contact partners. This process is preferably also referred to in the context of the invention as "bringing the contact partners together". In particular, it is preferred in the context of the invention that the movably mounted contact partner(s) is/are pushed onto the stationary contact partner(s), wherein the play or freedom of movement is advantageously provided by the invention in the region of the movably mounted contact partner. Then, in a second step, the at least one elastic means is stressed, for example by virtue of the elastic element being compressed or elastically deformed. Then, additional mechanical fixing or locking mechanisms may engage, for example the locking elements may engage with detent action or come to rest in recesses, mating contours, depressions or undercuts provided for this purpose. In the context of the invention, it is particularly preferred that the stress of the elastic element is present in the locked state. In other words, the elastic element may be in a compressed state in particular when the energy supply device has been connected to the power tool. The advantageous play and the freedom of movement of the spring-mounted contact partners or of the spring-mounted receiving device(s) are preferably also present in the connected state. In the context of the invention, it is preferred that the locking of the energy supply device in the power tool takes place in a force flow of the interface.

Thus, in the context of the present invention, a method is disclosed for connecting an energy supply device to a power tool, wherein the method is characterized by the following method step:
a) bringing together the contact partners of the energy supply device and of the power tool,
b) stressing the at least one elastic spring-mounting means,
c) engaging any locking elements with detent action in order to stably fix the energy supply device in the power tool.

In a second aspect, the invention relates to an energy supply device for use in the system. The energy supply device is preferably an energy supply device with a particularly long service life, and/or an energy supply device which is configured to output particularly high currents, in particular constant currents of more than 50 amperes, preferably more than 70 amperes, and most preferably more than 100 amperes. In the context of the invention, it is preferred that the energy supply device can be used in one of the systems.

The energy supply device may preferably be a storage battery or a preferably rechargeable battery. In the context of the invention, it is self-evidently also possible that the energy supply device has two or more storage batteries and/or batteries. The storage batteries and/or batteries may have so-called battery packs which, for example, comprise cylindrical cells. These cylindrical cells may for example contain a chemical substance comprising lithium ions, magnesium ions and/or sodium ions, without being restricted thereto. However, other cell types, for example with cuboid or cubic cells, may also be used in the context of the present invention.

The energy supply device is preferably an energy supply device with a particularly long service life, and/or an energy supply device which is configured to output particularly high currents, in particular constant currents of more than 50 amperes, preferably more than 70 amperes, and most preferably more than 100 amperes. The particularly long service life may preferably have the result that the energy supply device can withstand a particularly large number of insertion processes or insertion cycles without showing sustaining wear. In addition, the particularly long service life may mean that the chemical constituents of the energy supply device are configured to be rechargeable more often than previous energy supply devices without significantly aging. A major advantage of the contact system consists in that such high-powered energy supply devices can be reliably and easily connected thereto. In particular, owing to the spring mounting by the elastic means, the contact system is capable of transmitting high currents and, at the same time, of being used throughout the entire service life of the energy supply devices without sustaining wear. In this way, the advantages of new cell and battery technologies can be optimally utilized by means of the invention. With the invention, it is consequently possible to provide a system composed of power tool and energy supply device, which system allows efficient use of energy supply devices in battery-operated power tools, in particular also for applications and uses which impose very stringent electrical power requirements and/or very stringent service life requirements on the system or its interface.

In the context of the invention, it is preferred that the energy supply device comprises at least one cell, wherein the at least one cell has an internal resistance DCR_I of less than 10 milliohms (mohm). In preferred embodiments of the invention, the internal resistance DCR_I of the at least one cell may be less than 8 milliohms and preferably less than 6 milliohms. Here, the internal resistance DCR_I is preferably measured in accordance with standard IEC61960. The internal resistance DCR_I represents, in particular, the resistance of a cell of the energy supply device, wherein any components or accessories of the cell do not make any contribution to the internal resistance DCR_I. A low internal resistance DCR_I is advantageous, as this means that unwanted heat that needs to be dissipated does not arise at all. The internal resistance DCR_I is, in particular, a DC resistance which can be measured in the interior of a cell of the energy supply device. The internal resistance DCR_I can of course also assume intermediate values such as 6.02 milliohms; 7.49 milliohms; 8.33 milliohms; 8.65 milliohms or 9.5 milliohms.

It has been found that, with the internal resistance DCR_I of the at least one cell of less than 10 milliohms, it is possible to provide an energy supply device which has particularly good thermal properties in the sense that it can be operated particularly well at low temperatures, wherein the expenditure on cooling can be kept surprisingly low. In particular, an energy supply device with an internal cell resistance DCR_I of less than 10 milliohms is particularly well suited to supplying electrical energy to particularly high-powered power tools. Such energy supply devices can therefore make a valuable contribution to allowing storage-battery-operated power tools to be used even in areas of application that those skilled in the art previously assumed were not open to storage-battery-operated power tools.

Advantageously, such an energy supply device can be used to allow a battery-operated or storage-battery-operated power tool having an energy supply device according to the invention to be supplied with a high level of output power over a long period of time without damaging the surrounding plastics components or the cell chemistry within the cells of the energy supply device.

It is preferred in the context of the invention that a ratio of a resistance of the at least one cell to a surface area A of the at least one cell is less than 0.2 millionm/cm², preferably less than 0.1 milliohm/cm² and most preferably less than 0.05 milliohm/cm². In the case of a cylindrical cell, the surface area of the cell may be formed for example by the outer surface of the cylinder as well as the top side and the bottom side of the cell. Furthermore, it may be preferred in the context of the invention that a ratio of a resistance of the at least one cell to a volume V of the at least one cell is less than 0.4 milliohm/cm³, preferably less than 0.3 milliohm/cm³ and most preferably less than 0.2 milliohm/cm³. For conventional geometric shapes, such as cuboids, cubes, spheres or the like, a person skilled in the art knows the formulae for calculating the surface area or the volume of such a geometric body. In the context of the invention, the term "resistance" preferably denotes the internal resistance DCR_I which can preferably be measured in accordance with standard IEC61960. This is preferably a DC resistance.

It is preferred in the context of the invention that the at least one cell has a heating coefficient of less than 1.0 W/(Ah·A), preferably less than 0.75 W/(Ah·A) and particularly preferably less than 0.5 W/(Ah·A). Furthermore, the at least one cell may be designed to output a current of greater than 1000 amperes/liter substantially constantly. The discharge current is indicated in relation to the volume of the at least one cell, wherein the space measurement unit "liter" (l) is used as the unit for the volume. The cells according to the invention are therefore able to output a discharge current of substantially constantly greater than 1000 A per litre of cell volume. In other words, a cell with a volume of 1 liter is able to output a substantially constant discharge current of greater than 1000 A, wherein the at least one cell furthermore has a heating coefficient of less than 1.0 W/(Ah·A). In preferred embodiments of the invention, the at least one cell of the energy supply device may have a heating coefficient of less than 0.75 W/(Ah·A), preferably less than 0.5 W/(Ah·A). The unit for the heating coefficient is watts/(ampere hours·amperes). The heating coefficient can of course also have intermediate values, such as 0.56 W/(Ah·A); 0.723 W/(Ah·A) or 0.925 W/(Ah·A).

The invention advantageously allows the provision of an energy supply device having at least one cell which exhibits reduced heating and which is therefore particularly well suited to providing a supply to power tools in which high power levels and high currents, preferably constant currents, are desired for operation. In particular, the invention can be used to provide an energy supply device for a power tool, in the case of which the heat that may be generated during operation of the power tool and when electrical energy is being output to the power tool can be dissipated in a particularly simple and uncomplicated manner. Tests have shown that the invention can not only be used to more effectively dissipate existing heat. Rather, the invention prevents heat from being generated, or the quantity of heat generated during operation of the power tool can be considerably reduced using the invention. The invention can advantageously be used to provide an energy supply device which can supply electrical energy in an optimum manner primarily also to power tools that impose stringent requirements in respect of power and discharge current. In other words, the invention can provide an energy supply device for particularly high-powered power tools with which, for example, heavy drilling or demolition work can be performed on construction sites.

In the context of the invention, the term "power tool" should be understood to mean a typical device that can be used on a construction site, for example a building construction site and/or a civil engineering construction site. These may be hammer drills, chisels, core drills, angle or cut-off grinders, cutting devices or the like, without being restricted thereto. In addition, auxiliary devices such as those occasionally used on construction sites, such as lamps, radios, vacuum cleaners, measuring devices, construction robots, wheelbarrows, transport devices, feed devices or other auxiliary devices, can be "power tools" in the context of the invention. The power tool may in particular be a mobile power tool, wherein the energy supply device may also be used in particular in stationary power tools, such as frame-mounted drills or circular saws. However, preference is given to hand-held power tools that are, in particular, operated using a storage battery or battery.

It is preferred in the context of the invention that the at least one cell has a temperature cooling half-life of less than 12 minutes, preferably less than 10 minutes, particularly preferably less than 8 minutes. In the context of the invention, this preferably means that, with free convection, a temperature of the at least one cell is halved in less than 12, 10 or 8 minutes. The temperature cooling half-life is preferably determined in an inoperative state of the energy supply device, that is to say when the energy supply device is not in operation, that is to say connected to a power tool. In particular, energy supply devices with temperature cooling half-lives of less than 8 minutes have been found to be particularly suitable for use with high-powered power tools. The temperature cooling half-life can of course also have a value of 8.5 minutes, 9 minutes 20 seconds or of 11 minutes 47 seconds.

Owing to the surprisingly low temperature cooling half-life of the energy supply device, the heat generated during operation of the power tool or when it is charging remains within the at least one cell only for a short time. In this way, the cell can be recharged particularly quickly and is rapidly available for re-use in the power tool. Moreover, the thermal load on the components of the energy supply device or of the power tool having the energy supply device can be considerably reduced. As a result, the energy supply device can be preserved and its service life extended.

In the context of the invention, it is preferred that the at least one cell is arranged in a battery pack of the energy supply device. A series of individual cells can preferably be combined in the battery pack and in this way inserted into the energy supply device in an optimum manner. For example, 5, 6 or 10 cells may form a battery pack, with integer multiples of these numbers also being possible. For example, the energy supply device may have individual cell strings, which may comprise, for example, 5, 6 or 10 cells. An energy supply device having, for example, three strings of five cells each may comprise, for example, 15 individual cells.

In the context of the invention, it is preferred that the energy supply device has a capacity of at least 2.2 Ah, preferably at least 2.5 Ah. Tests have shown that the capacity values mentioned are particularly well suited to the use of high-powered power tools in the construction industry and satisfy the requirements there for the availability of electrical energy and the possible service life of the power tool particularly well.

The at least one cell of the energy supply device is preferably configured to output a discharge current of at least 20 A for at least 10 s. For example, a cell of the energy supply device may be designed to provide a discharge current of at least 20 A, in particular at least 25 A, for at least 10 s. In other words, the at least one cell of an energy supply device may be configured to provide a continuous current of at least 20 A, in particular at least 25 A.

It is also conceivable that peak currents, in particular short-term peak currents, may lead to intense heating of the energy supply device. Therefore, an energy supply device with powerful cooling, as can be achieved by the measures described here, is particularly advantageous. It is conceivable, for example, that the at least one cell of the energy supply device can provide at least 50 A for 1 second. In other words, it is preferred in the context of the invention that the at least one cell of the energy supply device is configured to provide a discharge current of at least 50 A for at least 1 s. Power tools can often require high levels of power for short time periods. An energy supply device with cells able to output such a peak current and/or such a continuous current may therefore be particularly suitable for high-powered power tools such as are used on construction sites.

It is preferred in the context of the invention that the at least one cell comprises an electrolyte, wherein the electrolyte is preferably present in a liquid physical state at room temperature. The electrolyte may comprise lithium, sodium and/or magnesium, without being restricted thereto. In particular, the electrolyte may be lithium-based. As an alternative or in addition, said electrolyte may also be sodium-based. It is also conceivable for the storage battery to be magnesium-based. The electrolyte-based energy supply device may have a rated voltage of at least 10 V, preferably at least 18 V, in particular of at least 28 V, for example 36 V. A rated voltage in a range of from 18 to 22 V, in particular in a range of from 21 to 22 V, is very particularly preferred. The at least one cell of the energy supply device can have, for example, a voltage of 3.6 V, without being restricted thereto.

It is preferred in the context of the invention that the energy supply device is charged, for example, at a charging rate of 1.5 C, preferably 2 C, and most preferably 3 C. A charging rate of xC can be understood as meaning the current intensity which is required to fully charge a discharged energy supply device in a fraction of an hour corresponding to the numerical value x of the charging rate x C. For example, a charging rate of 3 C allows the storage battery to be fully charged within 20 minutes.

It is preferred in the context of the invention that the at least one cell of the energy supply device has a surface area A and a volume V, wherein a ratio A/V of surface area to volume is greater than six times, preferably eight times, and particularly preferably ten times, the reciprocal of the cube root of the volume.

The statement that the surface area A of the at least one cell is greater than, for example, eight times the cube root of the square of the volume V can preferably also be expressed by the formula $A > 8*V^{(2/3)}$. Written another way, this relationship can be described by the fact that the ratio A/V of surface area to volume is greater than eight times the reciprocal of the cube root of the volume.

In order to check whether the above relationship is satisfied, values in the same basic unit must always be used. For example, if a value for the surface area in m$^2$ is inserted into the above formula, a value in the unit m$^3$ is preferably inserted for the volume. For example, if a value for the surface area in the unit cm$^2$ is inserted into the above formula, a value in the unit cm$^3$ is preferably inserted for the volume. For example, if a value for the surface area in the unit mm$^2$ is inserted into the above formula, a value in the unit mm$_3$ is preferably inserted for the volume.

Cell geometries which, for example, satisfy the relationship $A > 8*V^{(2/3)}$ advantageously have a particularly favorable ratio between the outer surface of the cell, which is critical for the cooling effect, and the cell volume. The inventors have recognized that the ratio of surface area to volume of the at least one cell of the energy supply device has an important influence on the removal of heat from the energy supply device. The improved cooling capability of the energy supply device can advantageously be achieved by increasing the cell surface area given a constant volume and a low internal resistance of the at least one cell. In the context of the invention, it is preferred that a low cell temperature with a simultaneously high power output can preferably be made possible if the internal resistance of the cell is reduced. Reducing the internal resistance of the at least one cell can result in less heat being generated. In addition, a low cell temperature can be achieved by using cells in which the surface area A of at least one cell within the energy supply device is greater than six times, preferably eight times, and particularly preferably ten times, the cube root of the square of the volume V of the at least one cell. It is thus possible in particular for the release of heat to the surroundings to be improved.

It has been found that energy supply devices whose cells satisfy the stated relationship can be cooled significantly more effectively than previously known energy supply devices having, for example, cylindrical cells. The above relationship can be satisfied, for example, by virtue of the fact that, although the cells of the energy supply device have a cylindrical basic shape, additional surface-area-enlarging elements are arranged on the surface thereof. Said elements can be, for example, fins, teeth or the like. Cells which do not have a cylindrical basic shape, but rather are shaped entirely differently, can also be used within the scope of the invention. For example, the cells of the energy supply device can have a substantially cuboidal or cubic basic shape. The term "substantially" is not unclear to a person skilled in the art here because a person skilled in the art knows that, for example, a cuboid with indentations or rounded corners and/or edges is also intended to fall under the term "substantially cuboidal" in the context of the present invention.

It is preferred in the context of the invention for the at least one cell to have a cell core, wherein no point within the cell core is more than 5 mm away from a surface of the energy supply device. When the energy supply device is being discharged, for example when it has been connected to a power tool and work is being performed with the power tool, heat may be generated in the cell core. In this specific embodiment of the invention, this heat can be transported on a comparatively short path as far as the surface of the cell of the energy supply device. The heat can be dissipated in an optimum manner from the surface. Therefore, such an energy supply device can exhibit good cooling, in particular comparatively good self-cooling. The time period until the limit temperature is reached can be extended and/or the situation of the temperature being reached can advantageously be entirely avoided. As a further advantage of the invention, a relatively homogeneous temperature distribution can be achieved within the cell core. This can result in uniform aging of the storage battery. This can in turn extend the service life of the energy supply device.

It is preferred in the context of the invention for the at least one cell to have a maximum constant current output of greater than 20 amperes, preferably greater than 30 amperes, most preferably greater than 40 amperes. The maximum constant current output is the quantity of current in a cell or an energy supply device that can be drawn without the cell or the energy supply device reaching an upper temperature limit. Possible upper temperature limits may lie in the region of 60° C. or 70° C., without being restricted thereto. The unit for the maximum constant current output is amperes.

In the case of all value ranges mentioned in the context of the present invention, it is always intended that all intermediate values are also considered to be disclosed. For example, in the case of the maximum constant current output, it is intended that values of between 20 and 30 A, that is to say 21, 22.3, 24, 25.55 or 27.06 amperes, for example, are also considered to be disclosed. Furthermore, it is intended that values of between 30 and 40 A, that is to say 32, 33.3, 36, 38.55 or 39.07 amperes, for example, are also considered to be disclosed.

It is preferred in the context of the invention for the energy supply device to have a discharge C rate of greater than $80 \cdot t^{(-0.45)}$, where the letter "t" stands for time in the unit seconds. The C rate advantageously allows quantification of the charging and discharge currents for energy supply devices, wherein the discharge C rate used here renders possible, in particular, the quantification of the discharge currents of energy supply devices. For example, the maximum permissible charging and discharge currents can be indicated by the C rate. These charging and discharge currents preferably depend on the rated capacity of the energy supply device. The unusually high discharge C rate of $80 \cdot t^{(-0.45)}$ advantageously means that the energy supply device can be used to achieve particularly high discharge currents which are required for operating high-powered power tools in the construction industry. For example, the discharge currents can lie in a range of greater than 40 amperes, preferably greater than 60 amperes or even more preferably greater than 80 amperes.

In the context of the invention, it is preferred that the cell has a cell temperature gradient of less than 10 Kelvin. The cell temperature gradient is preferably a measure of temperature differences within the at least one cell of the energy supply device, wherein it is preferred in the context of the invention for the cell to have a temperature distribution that is as uniform as possible, that is to say for a temperature in an inner region of the cell to differ as little as possible from a temperature which is measured in the region of a lateral or outer surface of the cell.

BRIEF DESCRIPTION OF THE DRAWINGS

Further advantages will become apparent from the following description of the figures. The figures, the description and the claims contain numerous features in combination. A person skilled in the art will expediently also consider the features individually and combine them to form useful further combinations.

In the figures, identical components and components of identical type are designated by the same reference signs.

In the drawing:

Figure 1:
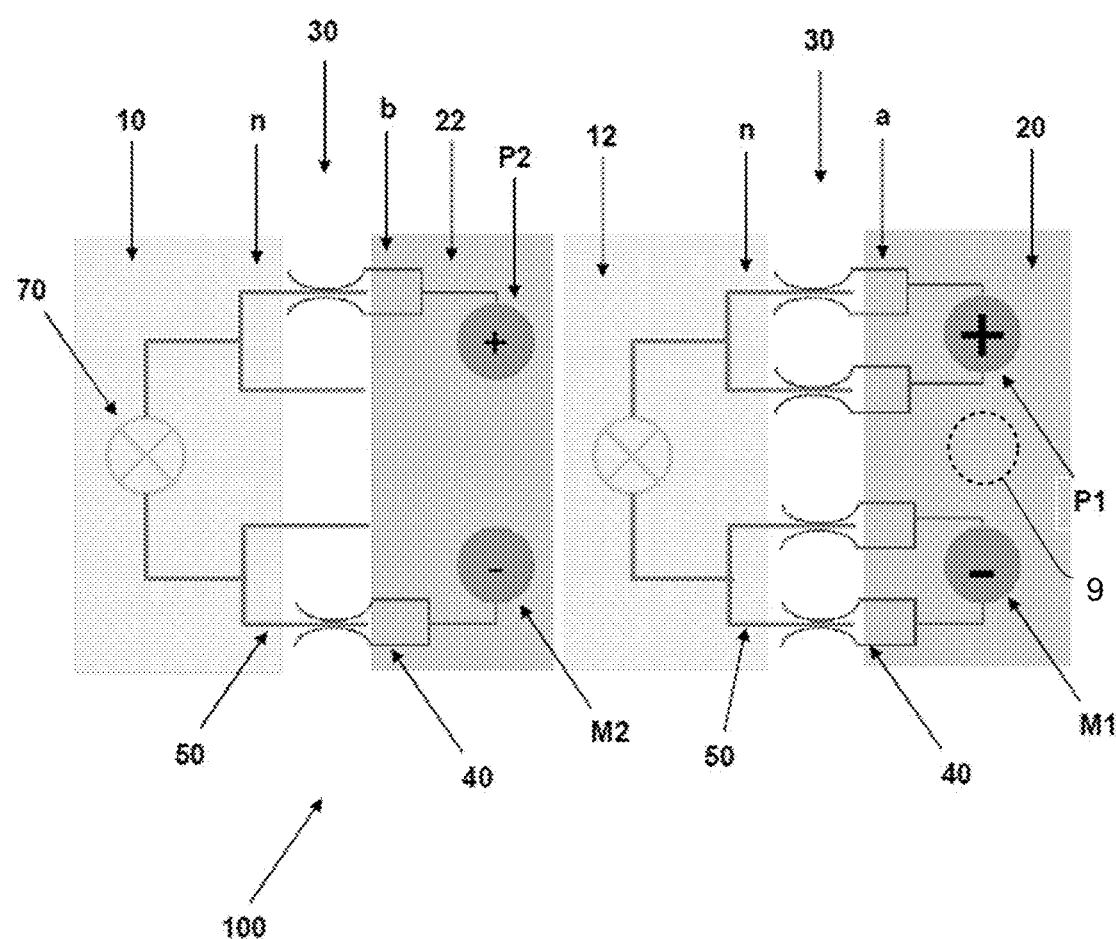
Figure 2:
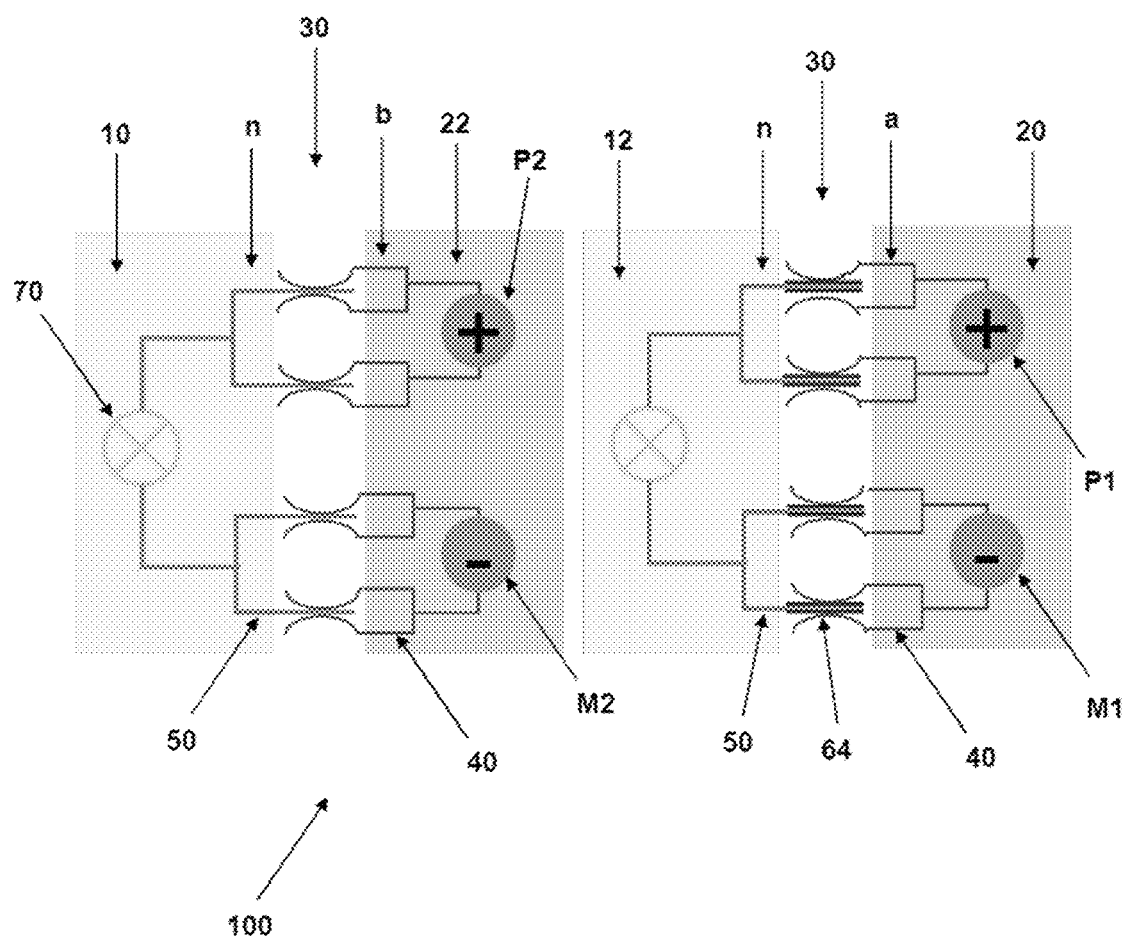
Figure 3:
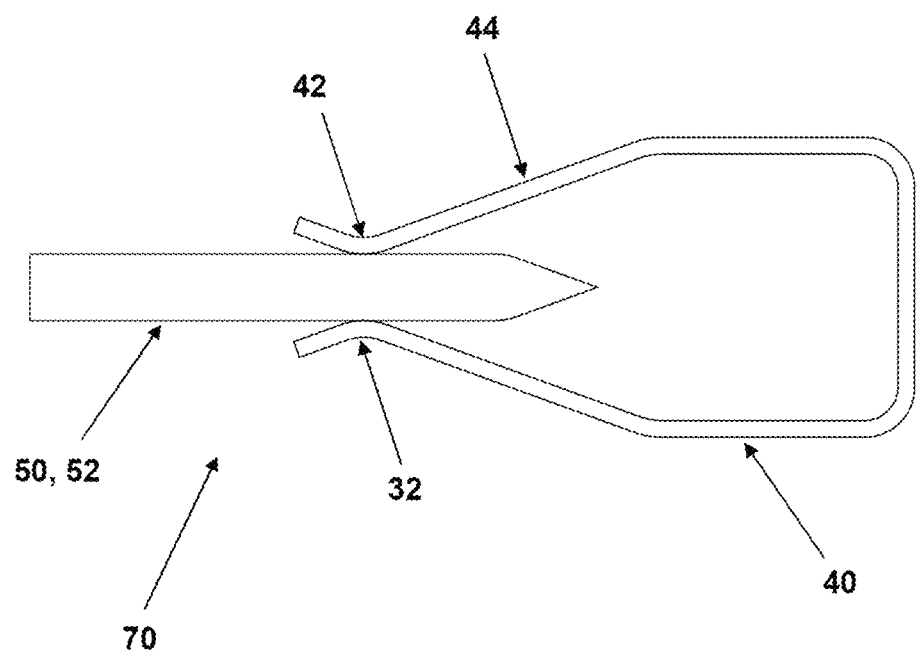
Figure 4A:
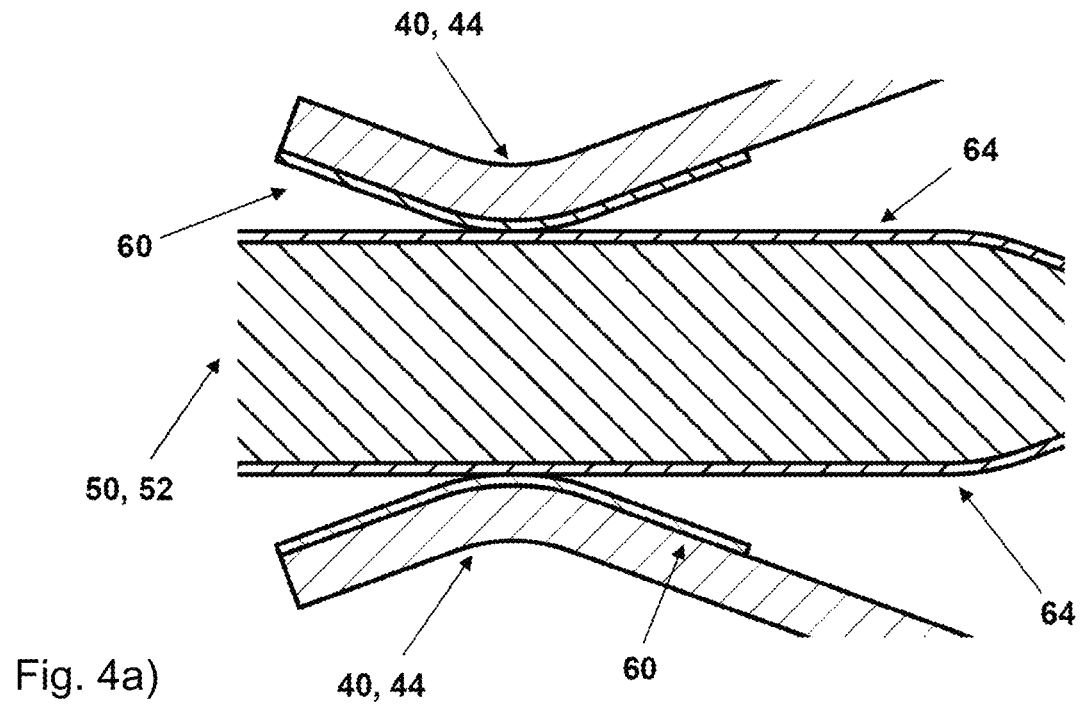
Figure 4B:
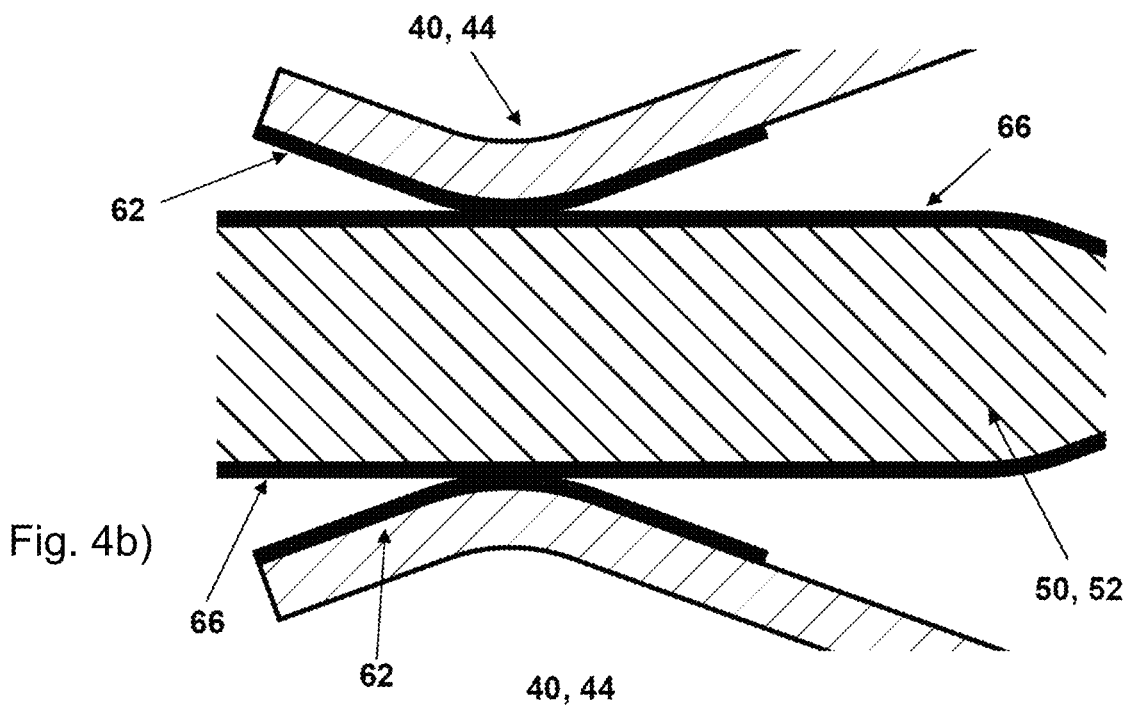

FIG. 1 shows a preferred embodiment of the system composed of power tool and energy supply device FIG. 2 shows a further preferred embodiment of the system composed of power tool and energy supply device FIG. 3 shows a possible embodiment of a unit composed of female and male contact partners FIGS. 4*a* and 4*b* are a schematic illustration of a possible embodiment of the contact partners with different coatings FIGS. 5*a*, 5*b* and 5*c* are an illustration of a possible process of connecting an energy supply device and power tool FIGS. 6*a*, 6*b*, 6*c* and 6*d* are an illustration of various combinations of spring mountings and arrangements of the contact partners FIGS. 7*a*, 7*b*, 7*c* and 7*d* are an illustration of various arrangements of the contact partners and the occupancies thereof FIGS. 8*a* and 8*b* are an illustration of various embodiments of the receiving device.

DETAILED DESCRIPTION

FIG. 1 shows a possible embodiment of the system 100 composed of two power tools 10, 12 and two energy supply devices 20, 22. In the exemplary embodiment of the invention illustrated in FIG. 1, two power tools 10, 12 and the first energy supply devices 20 and the second energy supply devices 22 are shown. An energy cell 9 is shown schematically. The first power tool 10 and the second power tool 12 each have four male contact partners 50, which are arranged in pairs. The male contact partners 50 are part of an interface 30, wherein the interface 30 in addition also has female contact partners 40. In the exemplary embodiment of the invention illustrated in FIG. 1, the female contact partners 40 are arranged on the energy supply devices 20, 22. The female contact partners 40 may constitute individual contacts, or may be integrated in a block or compartment. The block or compartment with the female contact partners 40 is referred to as receiving device. The power tools 10, 12 and the energy supply devices 20, 22 may together form a system 100, wherein the energy supply devices 20, 22 are configured to supply electrical energy to the power tools 10, 12.

The power tools 10, 12 have consumers 70, which may be formed for example by a motor of the power tools 10, 12. The energy supply devices 20, 22 each have a positive pole P1, P2 and a negative pole M1, M2, wherein the first positive pole P1 and the first negative pole M1 are arranged on the first energy supply device 20 and the second positive pole P2 and the second negative pole M2 are arranged on the second energy supply device 22. The contact partners of the power tools 10, 12 are denoted by the letters n, whereas the contact partners of the first energy supply device 20 are denoted by the letters a and the contact partners of the second energy supply device 22 are denoted by the letters b. In the exemplary embodiment of the invention illustrated in FIG. 1, the power tools 10, 12 each have four contact partners n, wherein the first power tool 10 has been connected to a second energy supply device 22 that has only two contact partners b. Two contact partners n of the first power tool 10 thus remain unused, and less current or electrical energy can be transmitted from the second energy supply device 22 to the first power tool 10 than from the first energy supply device 20 to the second power tool 12 (right-hand half of the image). The first energy supply device 20 has four contact partners a, such that each contact partner a of the first energy supply device 20 has been connected to a contact partner n of the second power tool 12. It is thus possible for a higher current, or more electrical energy, to be transmitted than in the case of the combination of the first power tool 10 with the second energy supply device 22 in the left-hand half of the image.

Preferably, each pole P1, P2, M1, M2 of the energy supply devices 20, 22 is connected to a respective contact partner a, b. For example, within the second energy supply device 22, both the positive pole P2 and the negative pole M2 are connected to a female contact partner 50. Within the first energy supply device 20, both the first positive pole P1 and the first negative pole M1 are connected to two female contact partners.

Although FIG. 1 shows that the male contact partners 50 are arranged on the power tools 10 and the female contact partners 40 are arranged on the energy supply devices 20, 22, a reversed arrangement may also be possible in which the male contact partners 50 are arranged on the energy supply devices 20, 22 and the female contact partners 40 are arranged on the power tools 10, 12.

In the exemplary embodiment of the invention illustrated in FIG. 1, a system 100 comprising two power tools 10, 12 and a first energy supply device 20 and a second energy supply device 22 is shown, wherein the first energy supply device 20 and the second energy supply device 22 are configured for supplying electrical energy to the power tool 10. The energy supply devices 20, 22 can be detachably connected to the power tools 10, 12 via an interface 30, wherein the interface 30 comprises at least one female contact partner 40 and one male contact partner 50. The power tools 10, 12 have at least two contact partners, in this case four, for transmitting electrical energy from the energy supply devices 20, 22 to the power tools 10, 12, wherein the first energy supply device 20 has four female contact partners a for transmitting electricity to the second power tool 12, wherein the four female contact partners a correspond with the male contact partners n of the second power tool 12. The second energy supply device 22 has two female contact partners b for transmitting electrical energy to the first power tool 10, wherein the two female contact partners b of the second energy supply device 22 correspond with the male contact partners n of the first power tool 10.

FIG. 2 shows a further preferred embodiment of the system 100 composed of power tools 10, 12 and energy supply devices 20, 22. In the exemplary embodiment of the invention illustrated in FIG. 2, each pole P1, P2, M1, M2 of the energy supply devices 20, 22 has been connected to in each case two female contact partners 40, wherein each of the female contact partners 50 of the energy supply devices 20, 22 has been connected to in each case one male contact partner 50 of one of the power tools 10, 12. In this exemplary embodiment of the invention, it is thus the case that all available contact partners n of the power tools 10, 12 are used to receive electrical energy from the energy supply devices 20, 22.

In the exemplary embodiment of the invention illustrated in FIG. 2, the blades 52 (see FIG. 3) of the male contact partners 50 of the second power tool 12 have a power tool coating 64 (see, e.g., FIG. 4). This may for example be a coating 64 with high wear resistance. In the exemplary embodiment of the invention illustrated in FIG. 2, the contact partners 50 of the first power tool 10 have no coating. In the context of the invention, provision is made in particular for the contact partners a, b of the energy supply devices 20, 22 to have coatings 60, 62. Such a first coating 60 of the first energy supply device 20 and such a second coating 62 of the second energy supply device 22 is for example illustrated schematically in FIG. 4. The coatings 60, 62, 64 are preferably configured to make the contact partners 40, 50 more robust and more durable with respect to mechanical and/or electrical loads.

FIG. 3 shows a possible embodiment of a unit composed of a female contact partner 40 and a male contact partner 50. FIG. 3 in particular shows an interface 30 (see, e.g., FIG. 2) which has a female contact partner 40 and a male contact partner 50. In particular, FIG. 3 shows a connected state in which the energy supply device 20 and the power tool 10 have been connected together such that current or electrical energy can flow from the energy supply device 20 toward the power tool 10. The blade 52 of the male contact partner 50 is arranged in the receiving terminal 44 or legs 44 of the female contact partner 40, wherein the contact partners 40, 50 together form a contact region 32 via which the current or electrical energy can be transmitted from the energy supply device 20 to the power tool 10. The contact region 32 is formed in particular in the region of a taper 42 of the female contact partner 40, in which the legs 44 or the components of the receiving terminal 44 of the female contact partner 40 adopt a minimum distance from one another. As a result, the legs 44 of the female contact partner 40 lie particularly closely against the blade 52 of the male contact partner 50.

FIGS. 4a and 4b are a schematic illustration of a possible embodiment of a female contact partner 40 and a male contact partner 50 with different coatings. For example, FIG. 4a illustrates a current transmission pair composed of a female contact partner 40 and a male contact partner 50, wherein the female contact partner 40 has a first coating 60 and the male contact partner 50 has a first power tool coating 64. The first coating 60 of the female contact partner 40 is preferably situated on the insides of the contact arms 44 of the female contact partner 40. The first power tool coating 64 of the male contact partner 50 is preferably situated on a surface of the blade 52 of the male contact partner 50. It is self-evidently also possible for the female contact partners 40 to be provided on the power tool 10 and to then correspondingly have a "power tool coating" 64, 66. Furthermore, it is also possible for the male contact partners 50 to be provided on the energy supply device 20 and to then correspondingly have a first coating 60 or a second coating 62.

FIG. 4b illustrates a current transmission pair composed of a female contact partner 40 and a male contact partner 50, wherein the female contact partner 40 has a second coating 62 and the male contact partner 50 has a second power tool coating 66. The second coating 62 of the female contact partner 40 is preferably situated on the insides of the contact arms 44 of the female contact partner 40. The second power tool coating 66 of the male contact partner 50 is preferably situated on a surface of the blade 52 of the male contact partner 50.

FIGS. 5a, 5b, 5c show a possible process of connecting an energy supply device 20 and a power tool 10. FIG. 5a shows the energy supply device 20 and power tool 10 in a separated state, in which the energy supply device 20 and power tool 10 are separate from one another. FIG. 5b shows the energy supply device 20 and power tool 10 at the moment in which the contact partners 40, 50 of the energy supply device 20 and of the power tool 10 have been brought together or pushed onto one another, wherein the elastic spring-mounting means 110 have not yet been elastically deformed in the state shown in FIG. 5b. This means that the elastic spring-mounting means 110 have not yet been stressed in the state shown in FIG. 5b, such that there is as yet no spring mounting of the contact partners 40, 50. FIG. 5c shows that the elastic spring-mounting means 110 have now been compressed, i.e. stressed. This state preferably corresponds to the locked state in which the energy supply device 20 and power tool 10 have been connected together, and in which the energy supply device 20 can supply electrical energy to the power tool 10.

The energy supply device 20 has a positive pole P1 and a negative pole M1, wherein a respective pole P1, M1 may be connected via a respective current conductor 26 to a contact partner, here a female contact partner 50. The current conductors 26 may preferably form an elastic current connection 26 between the spring-mounted female contact partners 40 in FIGS. 5a, 5b, 5c and the energy supply device 20. An elastic current conductor 26 is advantageously particularly highly suitable for assisting the mobility of the contact partners 40, 50, such that optimum decoupling of the contact partners 40, 50 can be ensured. In the context of the invention, it may be preferred that the preferably elastic current conductor 26 comprises or is formed by a braided wire. Preferably, the preferably elastic current conductor 26 comprises several individual wires which may preferably have been twisted together. For example, in the context of the invention, it may be preferred that the preferably elastic current conductor 26 comprises more than ten individual wires. The elastic spring-mounting means 110 preferably connect the contact partners, here the female contact partners 40, to the energy supply device 20. The power tool 10 may have a consumer 70, which may for example be the motor of the power tool 10. The reference signs in FIG. 5a apply analogously to the FIGS. 5b and 5c.

FIGS. 6a, 6b, 6c and 6d show various combinations of spring mountings and arrangements of the contact partners 40, 50. The exemplary embodiment of the invention shown in FIG. 6a has two male contact partners 50 with their blades 52 arranged on the power tool 10. The power tool 10 may comprise a consumer 70, for example a motor. FIGS. 6a, 6b, 6c and 6d show the power tool 10 and the energy supply device 20 in each case in the connected state. In FIG. 6a, the female contact partners 40 are present on the energy supply device 20, wherein the energy supply device 20 illustrated has in particular two female contact partners 40. In the exemplary embodiment of the invention shown in FIG. 6a, the number of female contact partners 40 thus corresponds to the number of male contact partners 50. In this context, this preferably means that the power tool 10 and the energy supply device 20 have the same number of contact partners 40, 50, wherein the power tool 10 shown in FIG. 6a has two male contact partners 50 and the energy supply device 20 shown in FIG. 6a has two female contact partners 40. The energy supply device 20 has two poles P1, M1, namely a positive pole P1 and a negative pole M1. The poles P1, M1 of the energy supply device 20 are connected via a respective, preferably elastic current conductor 26 to the contact partners 40, wherein the contact partners of the energy supply device 20 in FIG. 6a are female contact partners 40. In the exemplary embodiment of the invention shown in FIG. 6a, the spring mounting is present in the region, i.e. on the side, of the energy supply device 20. In the exemplary embodiments of the invention shown in FIGS. 6a) and 6d), the male contact partners 50 are each present on the power tool 10, whereas the female contact partners 40 are connected to the energy supply device 20. The reference signs in FIG. 6a are only given for the FIG. 6a, but apply analogously to the other FIGS. 6b, 6c, and 6d.

FIG. 6b shows an exemplary embodiment of the invention in which the power tool 10 has female contact partners 40, and the energy supply device 20 has male contact partners 50. Here too, both the power tool 10 and the energy supply device 20 have in each case two contact partners 40, 50. In the exemplary embodiment of the invention shown in FIG. 6b, the blades 52 of the male contact partners 50 are each connected to the energy supply device 20 via an elastic spring-mounting means 110, whilst the blades are also electrically connected via a current conductor 26 to a respective pole P1, M1 of the energy supply device 20. In the exemplary embodiment of the invention shown in FIG. 6b, too, the spring mounting is present in the region, i.e. on the side, of the energy supply device 20.

In the exemplary embodiments of the invention shown in FIGS. 6c and 6d, the spring mounting is present in each case in the region, i.e. on the side, of the power tool 10. FIG. 6c also shows an exemplary embodiment of the invention in which the power tool 10 has female contact partners 40, and the energy supply device 20 has male contact partners 50. The female contact partners 40 are conductively connected to the power tool 10 via a current conductor 26, wherein the electrical connection exists in particular between the female contact partners 40 and the consumer 70 of the power tool 10. The female contact partners 40 are also connected to the power tool 10 via elastic spring-mounting means 110. In the region of the energy supply device 20, the male contact partners 50, in particular their blades 52, are connected to a respective pole P1, M1 of the energy supply device 20. The energy supply device 20 has two male contact partners 50, wherein precisely one male contact partner 50 may be assigned to each pole P1, M1 of the energy supply device 20.

FIG. 6d also shows an exemplary embodiment of the invention in which the power tool 10 has male contact partners 50, and the energy supply device 20 has female contact partners 40. In the exemplary embodiment of the invention shown in FIG. 6d, the spring mounting, i.e. the elastic spring-mounting means 110, is present in the region of the power tool 10. The power tool 10 is connected to a respective male contact partner 50 or its blade 52 via the elastic spring-mounting means 110. In addition, in the exemplary embodiment of the invention shown in FIG. 6d), a current-conducting connection exists between the consumer 70 of the power tool 10 and the male contact partners 50. The current-conducting connection between the consumer 70 of the power tool 10 and the male contact partners 50 may in particular be achieved by a current conductor 26. In the exemplary embodiment of the invention shown in FIG. 6d), the energy supply device 20 has two female contact partners 40, wherein each female contact partner 40 of the energy supply device 20 may be assigned to a respective one of the two poles P1, M1 of the energy supply device 20.

FIGS. 7a, 7b, 7c and 7d show various arrangements of the contact partners 40, 50 and the occupancies thereof. FIG. 7a shows a power tool 10 with four male contact partners 50 and an energy supply device 20 with four female contact partners 40. The male contact partners 50 of the power tool 10 are conductively connected to a consumer 70 of the power tool 10, in order to supply this with electrical energy which the power tool 10 receives from the energy supply device 20. The female contact partners 40 of the energy supply device 20 are each connected via a respective current conductor to a pole P1, M1 of the energy supply device 20, wherein, in the exemplary embodiment of the invention shown in FIG. 7a, two female contact partners 40 are connected to the positive pole P1 of the energy supply device 20, and two other female contact partners 40 are connected to the negative pole M1 of the energy supply device 20. In addition, the female contact partners 40 are connected to the energy supply device 20 via an elastic spring-mounting means 110. The spring mounting in all FIGS. 7a, 7b, 7c, 7d takes place on the side of the energy supply device 20. In addition, a common feature is that the male contact partners 50 are present on the power tool 10, whereas the female contact partners 40 are arranged on the energy supply device 20. FIGS. 7a, 7b, 7c and 7d however differ with regard to the number of respectively present contact partners 40, 50, and the number of current transmission pairs that can be formed in each case. In the exemplary embodiment of the invention shown in FIG. 7a, four current transmission pairs are shown by way of example, each being composed of a female contact partner 40 and a male contact partner 50. With four current transmission pairs, a potential of the energy supply device 20 can be particularly effectively utilized, and a large quantity of electrical energy can be transmitted from the energy supply device 20 to the power tool 10. For example, currents of more than 50 A, preferably more than 70 A and most preferably more than 100 A can be transmitted with such an interface 30. The currents are preferably constant currents. The reference signs in FIG. 7a apply analogously to FIGS. 7b, 7c and 7d.

In the exemplary embodiment of the invention shown in FIG. 7b, two current transmission pairs are shown by way of example, each comprising a female contact partner 40 and a male contact partner 50, whilst two female contact partners 40 of the energy supply device 20 are not occupied, i.e. remain unused or "empty". In the exemplary embodiment of the invention shown in FIG. 7b, owing to the lower number of current transmission pairs, less current can be transmitted from the energy supply device 20 to the power tool 10 than in the exemplary embodiment of the invention shown in FIG. 7a, in which the interface 30 comprises four current transmission pairs. In the exemplary embodiment of the invention shown in FIG. 7b, the energy supply device 20 has four female contact partners 40, but the power tool 10 only has two male contact partners 50.

In the exemplary embodiment of the invention shown in FIG. 7c, it is likewise the case that two current transmission pairs are shown by way of example, each comprising a female contact partner 40 and a male contact partner 50, whilst two male contact partners 50 of the energy supply device 10 are not connected to a female contact partner 40. In the exemplary embodiment of the invention shown in FIG. 7c), owing to the lower number of current transmission pairs, less current can be transmitted from the energy supply device 20 to the power tool 10 than in the exemplary embodiment of the invention shown in FIG. 7a, in which the interface 30 comprises four current transmission pairs. In the exemplary embodiment of the invention shown in FIG. 7c, the power tool 10 has four male contact partners 50, but the energy supply device 20 only has two female contact partners 40.

In the exemplary embodiment of the invention shown in FIG. 7d, the power tool 10 has two male contact partners 50, and the energy supply device 20 has two female contact partners 40. Thus, in the exemplary embodiment of the invention shown, it is for example the case that two current transmission pairs are formed, and the amount of energy to be transmitted, or the magnitude of the currents that can be transmitted, corresponds to the exemplary embodiments of the invention shown in FIGS. 7b and 7c.

In the exemplary embodiments of the invention shown in FIGS. 5a to 7d, an individual spring mounting is shown in each case, that is to say, on that connection partner of the interface 30 at which the spring mounting takes place, each contact partner 40, 50 has an elastic spring-mounting means 110. This means that the contact partners 40, 50 are individually spring-mounted.

FIGS. 8a and 8b show receiving devices 80 which, in the exemplary embodiment of the invention shown in FIG. 8a, comprise the four female contact partners 40 of the energy supply device 20. The female contact partners 40 have been operatively connected in a known manner to the blades 52 of the male contact partners 50 such that current transmission pairs are formed, wherein, in the exemplary embodiment of the invention shown in FIG. 8a, four current transmission pairs are formed. The receiving device 80 shown in FIG. 8a is part of the energy supply device 20 and is connected to the poles P1, M1 of the energy supply device 20 via four current conductors 26, and is mechanically connected to the energy supply device 20 via two elastic spring-mounting means 60. The receiving device 80 preferably forms a contact block which can be spring-mounted as a block with a specific number of elastic spring-mounting means 110.

In the exemplary embodiment of the invention shown in FIG. 8b, two receiving devices 80 are shown, wherein two female contact partners 40 are present in each receiving device 80. Each of the two receiving devices 80 is connected to the energy supply device 20 via two elastic spring-mounting means 110, and to the poles P1, M1 of the energy supply device 20 via two current conductors 26. Here, in each case two current conductors 26 establish a connection between the positive pole P1 of the energy supply device 20 and the first receiving device 80a, whilst two other current conductors 26 establish the connection between the negative pole M1 of the energy supply device 20 and the second receiving device 80b. The reference signs in FIG. 8a apply analogously to FIG. 8b.

LIST OF REFERENCE SIGNS

10 First power tool
12 Second power tool
20 First energy supply device
22 Second energy supply device
26 Current conductor
30 Interface
32 Contact region
40 Female contact partner
42 Taper
44 Leg of female contact partner
50 Male contact partner
52 Blade
60 First coating
62 Second coating
64 First power tool coating
66 Second power tool coating
70 Consumer within the power tool, e.g. motor
80 Receiving device
90 Energy storage cell
100 System
110 Elastic spring-mounting means
n Contact partner of the first power tool
m Contact partner of the second power tool
Contact partner of the first energy supply device
b Contact partner of the second energy supply device
P1 Positive pole of the first energy supply device
M1 Negative pole of the first energy supply device
P2 Positive pole of the second energy supply device
M2 Negative pole of the second energy supply device

What is claimed is:

1. A system comprising:
a first power tool;
a first energy supply device;
a second energy supply device, the first and second energy supply devices detachably connectable to the power tool via an interface,
the first energy supply device has a number a of at least two contact partners for transmitting electrical energy to the power tool, and wherein the second energy supply device has a number b of at least two contact partners for transmitting electrical energy to the power tool, wherein the number a of contact partners of the first energy supply device differs from the number b of contact partners of the second energy supply device, and
a second power tool, wherein the first power tool has at least one first contact partner n1 for receiving electrical energy from one of the energy supply devices, wherein the second power tool has at least one second contact partner m1 for receiving electrical energy from one of the energy supply devices, wherein the number n of contact partners of the first power tool differs from the number m of contact partners of the second power tool.

2. The system as recited in claim 1 wherein the first and second energy supply devices have female contact partners or male contact partners.

3. The system as recited in claim 1 wherein the interface has at least one elastic current conductor.

4. The system as recited in claim 1 wherein a voltage of the first energy supply device and of the second energy supply device is equal.

5. The system as recited in claim 1 wherein the at least one contact partner is spring-mounted.

6. The system as recited in claim 1 wherein the first power tool or the first and second energy supply devices have at least one receiving device for receiving at least one contact partner.

7. The system as recited in claim 6 wherein the receiving device is spring-mounted.

8. A system comprising:
a power tool;
a first energy supply device; and
a second energy supply device, the first and second energy supply devices detachably connectable to the power tool via an interface,
the first energy supply device has a number a of at least two contact partners for transmitting electrical energy to the power tool, and wherein the second energy supply device has a number b of at least two contact partners for transmitting electrical energy to the power tool, wherein the first contact partners have a first coating and the second contact partners have a second coating;
wherein the first coating or the second coating is a coating with increased wear resistance.

9. The system as recited in claim 8 further comprising second power tool, wherein the first power tool has at least one first contact partner n1 for receiving electrical energy from one of the energy supply devices and wherein the second power tool has at least one second contact partner m1 for receiving electrical energy from one of the energy supply devices.

10. An energy supply device for use in the system comprising:
a first power tool;
a first energy supply device;
a second energy supply device, the first and second energy supply devices detachably connectable to the power tool via an interface,
the first energy supply device has a number a of at least two contact partners for transmitting electrical energy to the power tool, and wherein the second energy supply device has a number b of at least two contact partners for transmitting electrical energy to the power tool, wherein the number a of contact partners of the first energy supply device differs from the number b of contact partners of the second energy supply device,
the first energy supply device comprising at least one energy storage cell, wherein the at least one energy storage cell has an internal resistance DCR_I of less than 10 milliohms.

11. The energy supply device as recited in claim 10 wherein the at least one energy storage cell has a surface area A and a volume V, wherein the ratio A/V of the surface area to the volume is greater than six times the inverse of the cube root of the volume.

12. The energy supply device as recited in claim 11 wherein the ratio A/V is greater than eight times the inverse of the cube root of the volume.

13. The energy supply device as recited in claim 11 wherein the ratio A/V is greater than ten times the inverse of the cube root of the volume.

14. The energy supply device as recited in claim 11 wherein a ratio of a resistance of the at least one cell to the surface area A is less than 0.2 milliohm/cm$^2$.

15. The energy supply device as recited in claim 14 wherein the ratio is less than 0.1 milliohm/cm.

16. The energy supply device as recited in claim 14 wherein the ratio is less than 0.05 milliohm/cm$^2$.

* * * * *